(12) United States Patent
Bookspan et al.

(10) Patent No.: US 6,636,888 B1
(45) Date of Patent: Oct. 21, 2003

(54) SCHEDULING PRESENTATION BROADCASTS IN AN INTEGRATED NETWORK ENVIRONMENT

(75) Inventors: Matthew Bookspan, Redmond, WA (US); Shashank Mohan Parasnis, Palo Alto, CA (US); Paul O. Warrin, San Francisco, CA (US); Paul C. Poon, San Jose, CA (US); Paresh Patel, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,754

(22) Filed: Jun. 15, 1999

(51) Int. Cl.[7] .............................................. G06F 15/16

(52) U.S. Cl. ..................... 709/203; 709/200; 709/202; 709/217; 709/219; 709/231

(58) Field of Search ................................ 709/200–206, 709/217–219, 226–227, 231–232; 725/86–87, 104, 110–112, 118–119

(56) References Cited

U.S. PATENT DOCUMENTS

| | | | | |
|---|---|---|---|---|
| 5,367,330 A | * | 11/1994 | Haave et al. ................ | 725/104 |
| 5,440,677 A | | 8/1995 | Case et al. .................. | 395/154 |
| 5,727,156 A | | 3/1998 | Herr-Hoyman et al. ...................... | 395/200.49 |
| 5,941,951 A | * | 8/1999 | Day et al. ................... | 709/233 |
| 5,982,445 A | * | 11/1999 | Eyer et al. .................. | 709/218 |
| 5,996,015 A | * | 11/1999 | Day et al. ................... | 709/226 |
| 6,108,687 A | | 8/2000 | Craig ......................... | 709/203 |
| 6,138,144 A | * | 10/2000 | DeSimone et al. ......... | 709/204 |
| 6,249,281 B1 | | 6/2001 | Chen et al. ................. | 345/330 |
| 2001/0013068 A1 | | 8/2001 | Klemets et al. ............ | 709/231 |

OTHER PUBLICATIONS

"Office 2000: A Closer Look Power Point 2000." nd. 3pp. Available techweb.com/winmag/library/1998/preview/office2000d.htm.
Kenny, Cathy. 1998. "PowerPoint 2000, Now Presenting on the Web." Available pcworld.com/resource/printable/article/0,aid,7770,00.asp.
Rutledge, Patrice–Anne et al. 1999. "Using Online Broadcasts and Meetings: Special Edition Using Microsoft PowerPoint 2000." McMillan Computer Publishing. 24pp. Available loc.gov/cgi–bin/formprocessor/copyright/locis.pl.

(List continued on next page.)

Primary Examiner—Bharat Barot
(74) Attorney, Agent, or Firm—Ronald M. Anderson

(57) ABSTRACT

An integrated environment for scheduling a presentation broadcast that allows a user to seamlessly schedule, make changes, replace, and reschedule a presentation broadcast from within a presentation design application program. The system leverages many of the features of Microsoft's OUTLOOK™ program to schedule a network presentation broadcast of a presentation broadcast from within the presentation design application program that is used to create or open the presentation. The user enters information concerning the presentation broadcast while within the presentation design application program, which is then automatically inserted into a meeting request message automatically sent to a list of prospective attendees of the presentation broadcast that the user has identified. The meeting request message also contains user-entered scheduling information, which is employed to automatically schedule a presentation broadcast meeting in the electronic calendars of those message recipients who choose to attend the presentation broadcast. The system also automatically schedules the presentation broadcast in the user's electronic calendar, which provides a reminder to the user to start the presentation broadcast a predefined interval before the scheduled time. Additionally, the automated scheduling is implemented for a presentation broadcast that is to originate from an Internet web server.

30 Claims, 16 Drawing Sheets

OTHER PUBLICATIONS

Petrovsky, Michele. 1997. "Dynamic HTML in Action." 12pp. Available loc.gov/cgi–bin/formprocessor/copyright/locis.pl.

Courter, Gini and Annette Marquis. 1999. "Mastering Microsoft Office 2000 Premium Edition." Available loc.gov/cgi–bin/formprocessor/copyright/locis.pl.

Dyson, Peter. 1997. Adding Audio and Video with NetShow: Mastering Microsoft Internet Information Server 4. 36pp. Available loc.gov/cgi–bin/formprocessor/copyright/locis.pl.

RealNetworks. 1998. "Chapter 7: Broadcasting Presentation." 11pp. Available service.real.com/help/library/guides/g2/htmfiles/strmlive.htm.

Microsoft Corporation. 1999. Configuring Client Computers for Presentation Broadcasting. 15pp., Available microsoft.com/office/ork/2000/five/70t_4.htm.

Microsoft Corporation. 1999. "Window Media Services." 3pp. Available microsoft.com/windows2000/server/evaluation/features/media.asp.

Microsoft Corporation. 1999. Installing Presentation Broadcasting and Scheduling Broadcasts. 4pp. Available lsu.lboro.ac.uk/staff/manuals/Of2KResKit/five/70t4_1.htm.

Microsoft Corporation. 1999. Using NetShow Services with Presentation Broadcasting. 4pp. Available lsu.lboro.ac.uk/staff/manuals/Of2KResKit/five/70t4_2.htm.

Microsoft Corporation. 1999. PPT2000: Overview of Online Broadcasting with NetShow. 3pp. Available support.microsoft.com/default.aspx?scid=KB;EN–US;Q229826&.

* cited by examiner

```
<TITLE> - MEETING
FILE  EDIT  VIEW  INSERT  FORMAT  TOOLS  ACTIONS  HELP
SAVE AND CLOSE | SEND UPDATE | VIEW NETSHOW    ... | RECURRENCE... | INVITE ATTENDEES...  !  X
     904          906    908                          902                910
APPOINTMENT | ATTENDEE AVAILABILITY
  THIS IS AN ONLINE MEETING
  NO RESPONSES HAVE BEEN RECEIVED FOR THIS MEETING
                 912
TO:
SUBJECT:
LOCATION:                                                             900
  EVENT ADDRESS
                                    ☑ THIS IS AN ONLINE MEETING   NETSHOW SERVICES
START TIME:  MON 4/5/99    4:00 PM     ☐ AUTOMATICALLY START NETSHOW WITH REMINDER
END TIME:    MON 4/5/99    4:30 PM     ☐ ALL DAY EVENT
☑ REMINDER: 15 MINUTES   SHOW TIME AS: BUSY

SUBJECT: <TITLE>
DESCRIPTION: <DESCRIPTION>
SPEAKER: <SPEAKER>
CONTACT: <CONTACT>
EVENT ADDRESS (URL): <EVENT ADDRESS>
NOTE: ONLINE VIEWING OF LIVE BROADCAST WILL BE LIMITED TO 15 PEOPLE

CONTACTS...                              CATEGORIES...            ☐ PRIVATE
```

| MICROSOFT NETSHOW NETWORK-MICROSOFT INTERNET EXPLORER |
|---|
| FILE  EDIT  VIEW  GO  FAVORITES  HELP |
| BACK  FORWARD  STOP  REFRESH  HOME  SEARCH  FAVORITES  HISTORY |
| ADDRESS  HTTP://MSNETSHOW/NETWORK/SUBMITEVENT.HTM  ▼LINKS |

Microsoft
NetShow
Network

Event Submission

COMPLETE THIS FORM TO OBTAIN COVERAGE OF YOUR EVENT. AFTER SUBMITTING THE EVENT, YOU WILL BE CONTACTED BY A NETSHOW ADMINISTRATOR FOR ADDITIONAL PROGRAMMING INFORMATION BEFORE THE EVENT WILL BE DISPLAYED ON THE NETSHOW NETWORK.

TITLE  [<TITLE>]  ─1102

DESCRIPTION  [<DESCRIPTION>]  ─1104

START DATE/TIME  [    ]  ─1106
(MM/DD/YY HH:MM AM)
END DATE/TIME  [    ]  ─1108
(MM/DD/YY HH:MM AM)
RELATED URL  [    ]  ─1110
(OPTIONAL)
LOCATION  [<LOCATION>]  ─1112
CONTACT'S E-MAIL ALIAS  [<USER'S ALIAS>]  ─1114
CONTENT TYPE  ⦿ LIVE  ○ ON-DEMAND  ○ LIVE WITH SLIDES
1116

[SUBMIT EVENT REQUEST]

SCHEDULING PRESENTATION BROADCASTS IN AN INTEGRATED NETWORK ENVIRONMENT

FIELD OF THE INVENTION

This invention generally concerns online presentation broadcasting over a network, and more particularly, the scheduling of presentation broadcasts in an integrated network environment.

BACKGROUND OF THE INVENTION

Online presentation broadcast technology allows people to "attend" a virtual presentation broadcast by presentation broadcasting the presentation broadcast over a network to computers that are accessible to the attendees. Recent advancements in networking and online presentation broadcasting technology have led to a rapid increase in the use of such virtual presentation broadcasts, particularly over intranets, within large corporations. Of course, the advantages of virtual presentation broadcasts are perhaps best realized over the Internet, which can reach an even greater audience. While these advancements have been dramatic, the scheduling of online presentation broadcasts has not advanced much at all. Consequently, many of the problems that have long been associated with scheduling an in-person presentation broadcast are still experienced when scheduling an online presentation broadcast using the computer tools currently available.

Typically, the scheduling of online presentation broadcasts is performed in the following manner. The originator of the presentation broadcast (usually the creator of the presentation broadcast) decides when the presentation broadcast is to be presentation broadcast, and specifies a network location where the presentation broadcast can be accessed by remote attendees. Once this presentation broadcast information is established, the originator must identify the expected attendees of the presentation broadcast. Typically, the originator creates or generates a list of attendees and notifies each of these attendees by either calling them on the telephone to provide them with the presentation broadcast information, or sending an e-mail invitation to each of the attendees. The advantage of using e-mail is that the notification is in a tangible form, and a single e-mail may be sent to multiple prospective attendees. When using conventional e-mail applications, all of the presentation broadcast information, along with the start time and duration of the presentation broadcast must be manually entered into the e-mail message. Furthermore, in many instances, the recipients of the e-mail message must thereafter manually enter such information into their electronic (or manual) calendar or personal information manager. Likewise, the originator of the presentation broadcast must also manually enter the presentation broadcast information into a calendar or personal information manager to ensure that a timely reminder is provided to start the presentation broadcast at the specified time.

All of the foregoing manual steps are time consuming and often lead to errors. Further, if the originator decides to change the time of a presentation broadcast, it is necessary to call or e-mail the prospective attendees to advise them of the new time. If the original e-mail message sent by the originator was not saved, a new list of attendees must be generated, but may not correspond to the original list. Additional phone calls or e-mail messages must also be made if the network location of the presentation broadcast is moved. It is also probable that an attendee might miss the presentation broadcast if it is forgotten, or through failure to check a calendar, or if incorrect information was manually entered in the calendar.

It would therefore be desirable to provide a system for scheduling a presentation broadcast in a more automated fashion that avoids these problems. For example, it would be advantageous to have some or all of the presentation broadcast information automatically generated and included in e-mail messages sent to prospective attendees. It would also be beneficial to automatically generate and send e-mail messages to the list of prospective attendees in the event that a presentation broadcast is rescheduled, or its network location is changed. Additionally, it would be advantageous to provide means for automatically entering information into the presentation broadcast originator's calendar or personal information manager that indicates the date and time of the presentation broadcast.

SUMMARY OF THE INVENTION

The present invention addresses many of the shortcomings associated with the conventional scheduling of online presentation broadcasts by providing a system and a method that allows a user to seamlessly schedule, make changes in, replace, and reschedule a presentation broadcast, from within an integrated environment. The system leverages many of the features of Microsoft Corporation's OUTLOOK™ application program to schedule a network presentation broadcast of a presentation broadcast from within the presentation broadcast design application program that is used to create the presentation broadcast. These programs allow the user to easily schedule the presentation broadcast (or make changes to a previously scheduled presentation broadcast) from within the presentation broadcast design program.

According to a first aspect of the invention, a method is provided for scheduling an online presentation broadcast that is to be presentation broadcast over a network to a plurality of virtual presentation broadcast attendees. A user initiates the method by opening an existing presentation broadcast document or creating a new presentation broadcast in a presentation broadcast design application program. The user then enters information concerning the presentation broadcast of the presentation broadcast within fields and by activating controls included in one or more dialogs that are displayed. The information describes the presentation broadcast and identifies the presentation broadcast server that will be employed for the presentation broadcast. A meeting request dialog containing fields completed with default data comprising the presentation broadcast information is presented to the user, and the user is enabled to generate a list of attendees to receive a meeting request to "attend" the presentation broadcast. The user then sends the meeting request via e-mail to the attendees on the list. The e-mail services preferably are provided by Microsoft's OUTLOOK™ program. If a recipient of the meeting request message is also using the OUTLOOK™ program, the presentation broadcast is automatically entered into a calendar of the program in response to a decision by the recipient to attend the presentation broadcast. OUTLOOK™ provides an automatic reminder to the recipients just prior to the start of the presentation broadcast (if they have chosen to attend) that enables them to "join" the presentation broadcast in a timely manner.

According to another aspect of the invention, the user is enabled to change the presentation broadcast information by modifying the information that was previously entered in the one or more dialogs and is also enabled to reschedule the meeting by selecting a reschedule option, which opens a dialog that is substantially similar to the meeting request dialog and which facilitates changing the time and/or date of the presentation broadcast. A new set of e-mail messages is then automatically sent out to the list of attendees generated above. The presentation broadcast is also automatically rescheduled in the user's calendar.

According to yet another aspect of the invention, the user is enabled to replace a prior presentation broadcast document for a scheduled presentation broadcast with a replacement presentation broadcast document. The user is enabled to select a previously scheduled presentation broadcast, and then substitute the replacement presentation broadcast document for the prior presentation broadcast document of the selected presentation broadcast. Information for the replacement presentation broadcast document is then entered into the originator's calendar, and the scheduling information for the replacement presentation broadcast document is written into a presentation broadcast document file.

Still another aspect of the invention is directed to a system for scheduling a presentation broadcast. The system includes a local computer that is connected to a plurality of remote computers across a network. The local computer includes a processor that executes a presentation broadcast design application program, and an information management application program is also stored in memory and is executable by the processor. The presentation broadcast design application program enables a user to create a presentation broadcast document or to reference an existing presentation broadcast document, and enables the user to enter presentation broadcast information concerning a broadcast of the document from within the presentation broadcast design program. The presentation broadcast information is then passed to the information management application program, which sends a meeting request message comprising the presentation broadcast information to a list of presentation broadcast attendees selected by the user. Preferably, the remote computers include a memory in which the information management application program is also stored and executable by a processor in each remote computer. The system facilitates implementation of the various scheduling functions discussed above, including rescheduling, replacing presentation broadcasts, and providing automated calendar entries and reminders.

According to still another aspect of the invention, a method is provided for scheduling a broadcast of a presentation through an Internet web server. In one preferred form of the invention, this server executes a Microsoft Corporation NETSHOW™ program. A presentation broadcast document is opened in a presentation broadcast design application program and presentation broadcast information is entered into one or more dialogs from within the presentation broadcast design program, as noted above. The presentation broadcast information is then conveyed to the Internet web server, which launches a web page comprising an event submission form that includes a plurality of fields for entering presentation broadcast and scheduling information. The presentation broadcast and scheduling information is entered into the form and saved to the Internet web server; this information is then used to schedule the presentation broadcast on the Internet web server. The Internet web server preferably issues a lobby page comprising the scheduling information and a portion of the presentation broadcast information to advise potential attendees of the time of the presentation broadcast and to identify the subject of the presentation broadcast.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 7 is a dialog for a meeting request displaying exemplary presentation broadcast information used for generating a list of presentation broadcast attendees who will receive an email including the presentation broadcast information;

FIG. 11 is a dialog used to notify presentation broadcast attendees that a presentation broadcast has been rescheduled;

FIG. 13 is a representation broadcast of a web page that includes presentation broadcast schedule information;

DESCRIPTION OF THE PREFERRED EMBODIMENT

The invention addresses many of the limitations associated with conventional scheduling of online presentation broadcasting by providing an integrated environment for scheduling a presentation broadcast that allows a user to seamlessly schedule, make changes, replace, and reschedule a presentation broadcast—all from within a presentation broadcast design application program that is used to create the presentation broadcast. With reference to an exemplary operating environment discussed below, scheduling of a presentation broadcast of a presentation broadcast can be performed (from a user's viewpoint) entirely from within a presentation broadcast design application program that is executed on the user's local computer. The presentation broadcast design application is used to both create and presentation broadcast the presentation broadcast at a designated time. The user can enter information concerning the presentation broadcast while working within the presentation broadcast design application and thus cause e-mails containing information relating to the presentation broadcast and its scheduled date and time to be generated and transmitted to prospective attendees without requiring the user to open a separate e-mail program (this is performed behind the scene transparently to the user). After the presentation broadcast is scheduled, the user can perform a broadcast of the presentation from within the presentation broadcast design application.

In order to take advantage of all the features of the present invention as described below, in a preferred embodiment of this invention, several application programs must be installed on the local computer that is used to create and schedule the presentation broadcast. These programs include Microsoft Corporation's POWERPOINT 2000™, OUTLOOK 2000™ (hereinafter OUTLOOK™), and INTERNET EXPLORER 4.0™ or later, all of which run on Microsoft's WINDOWS™ operating systems, such as WINDOWS 98™ and WINDOWS NT™. Preferably, the remote computers of the prospective attendees will also be running one of these Microsoft WINDOWS™ operating systems and will have the OUTLOOK™ program installed on them. If the presentation broadcast is expected to reach more than a predefined number of attendees, (e.g., 15 attendees) the presentation broadcast is preferably transmitted from a server running Microsoft Corporation's NETSHOW™ server program.

Exemplary Operating Environment

Figure 19:
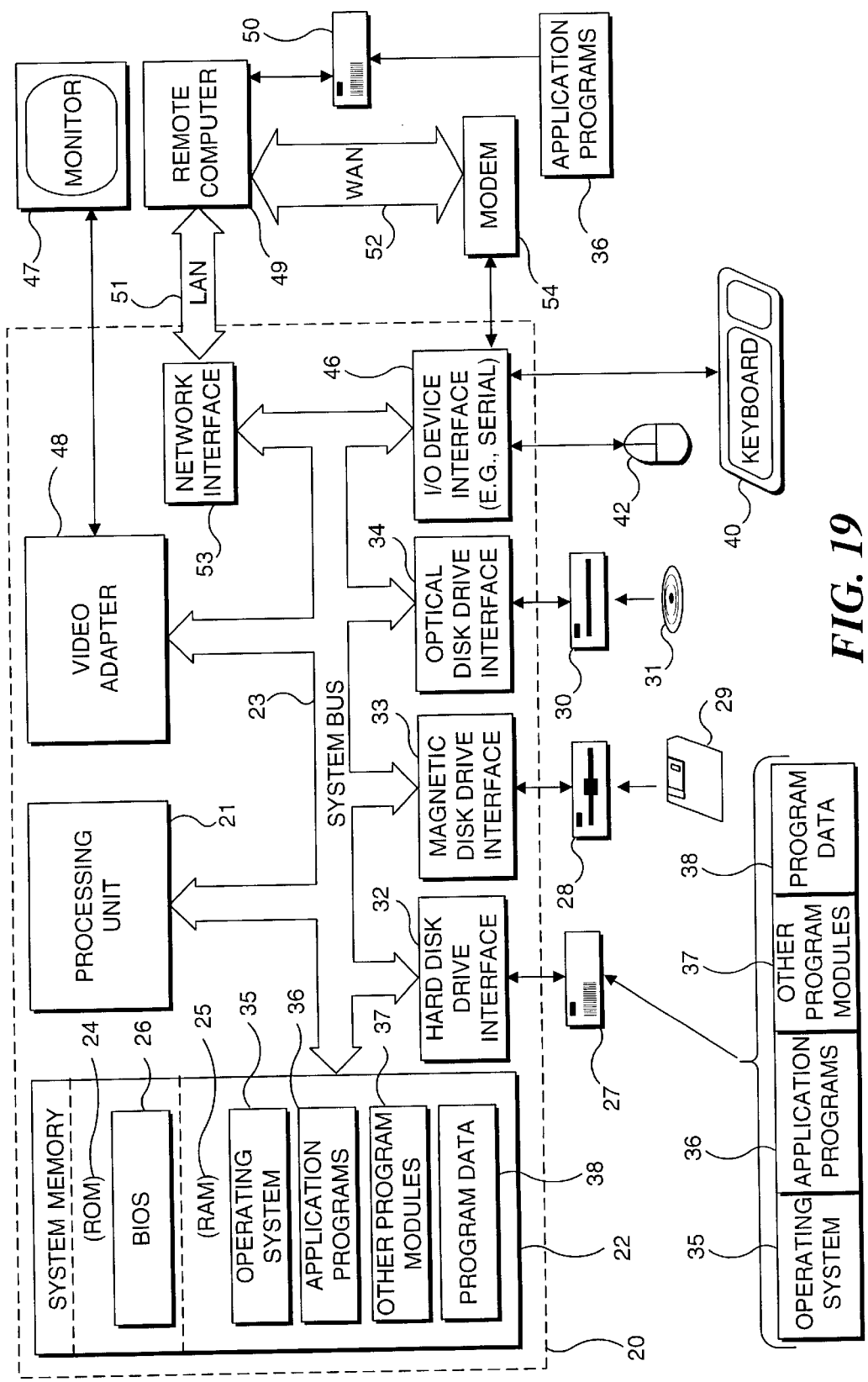
FIG. 19 is a schematic block diagram illustrating an exemplary computer system for practicing the present invention.

FIG. 19 and the following discussion are intended to provide a brief, general description of a suitable computing environment in which the invention may be implemented. The foregoing application programs (Microsoft's POWERPOINT 2000™, OUTLOOK™, and INTERNET EXPLORER™) comprise a plurality of program modules that include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 19, an exemplary system for implementing the invention includes a general purpose computing device in the form of a conventional personal computer 20, including a processing unit 21, a system memory 22, and a system bus 23 that couples various system components including the system memory to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26 contains basic routines that help to transfer information between elements within personal computer 20, such as during start-up, and is stored in ROM 24. Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable instructions, data structures, program modules, and other data for personal computer 20. Although the exemplary environment described herein employs hard disk 27, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 27, magnetic disk 29, optical disk 31, ROM 24, or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device, or other common network node, and typically includes many or all of the elements described above relative to personal computer 20, although only a memory storage device 50 has been illustrated in FIG. 19. The logical connections depicted in FIG. 19 include a local area network (LAN) 51 and a wide area network (WAN) 52. Such networking environments are commonplace in offices, enterprise wide computer networks, intranets, and the Internet.

When used in a LAN networking environment, personal computer 20 is connected to local network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

Process for Scheduling a Presentation Broadcast

Figure 1:
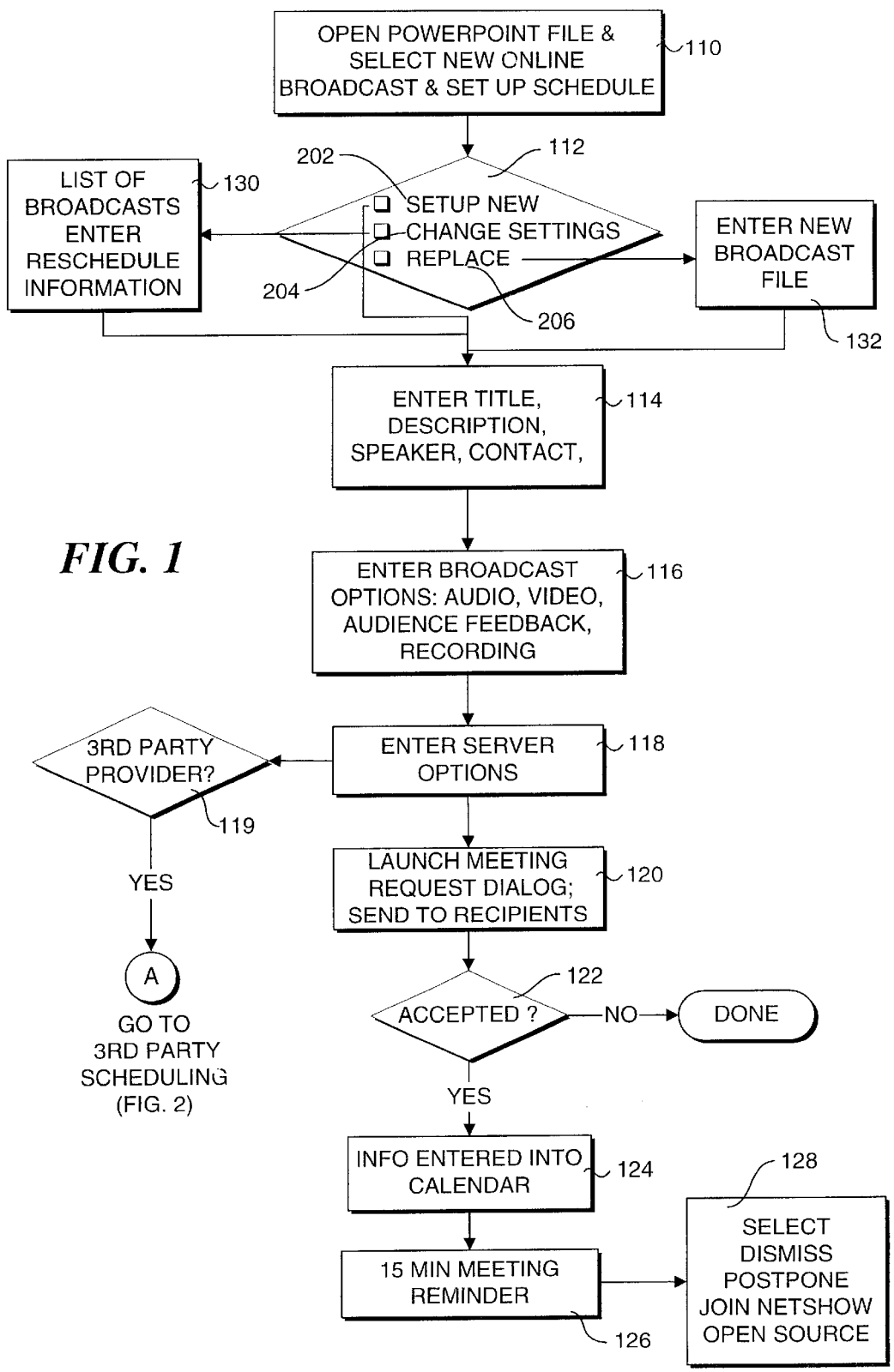
FIG. 1 is a flowchart illustrating the logic a preferred embodiment of the present invention uses when scheduling a presentation broadcast.

The process for scheduling a presentation broadcast is described below with reference to the logic illustrated in the flowchart of FIG. 1, in conjunction with various dialog boxes shown in FIGS. 3–12. Referring to FIG. 1, the scheduling process begins in a block 110, wherein a user opens an existing presentation broadcast document (or creates a new presentation broadcast document) in the POWERPOINT 2000™ presentation broadcast design application (hereinafter referred to simply as "POWERPOINT"). The presentation broadcast document is a document that includes one or more slides or pages the user wishes to presentation broadcast to an online audience at a future date and time. The user initiates the scheduling of an online presentation broadcast by activating the "Slide Show" top menu item and selecting the "Online Broadcast→Set up and Schedule" menu option. The flowchart logic then proceeds to a decision block 112, which displays a schedule presentation broadcast dialog 200 (shown in FIG. 3). Decision block 112 presents three options, including a "setup new" option 202, a "change settings" option 204, and a "replace scheduled presentation broadcast" option 206. These options are also included in schedule presentation broadcast dialog 200, and may be accessed by activating one of their respective associated radio buttons 203, 205, 207 (FIG. 3).

Selecting setup new option 202 enables the user to set up and schedule a new presentation broadcast. Selecting change settings option 204 enables the user to change the settings of a currently-scheduled presentation broadcast, including rescheduling the time(s) of the presentation broadcast. This option is disabled if the presentation broadcast has not been scheduled. Selecting replace scheduled presentation broadcast option 206 enables the user to select a previously scheduled presentation broadcast and replace it's presentation broadcast file with a the presentation broadcast file of the presentation broadcast on which the user is currently working. Activating a "tips for broadcast" button 210 launches an assistant with help on presentation broadcasting. The assistant provides help information concerning the scheduling and issuance of a presentation broadcast, including FAQs, presentation tips, and limitations. It is likely that expert users may have the assistant turned off, in which case the "tips for presentation broadcast button" will be disabled or grayed.

Figure 3:
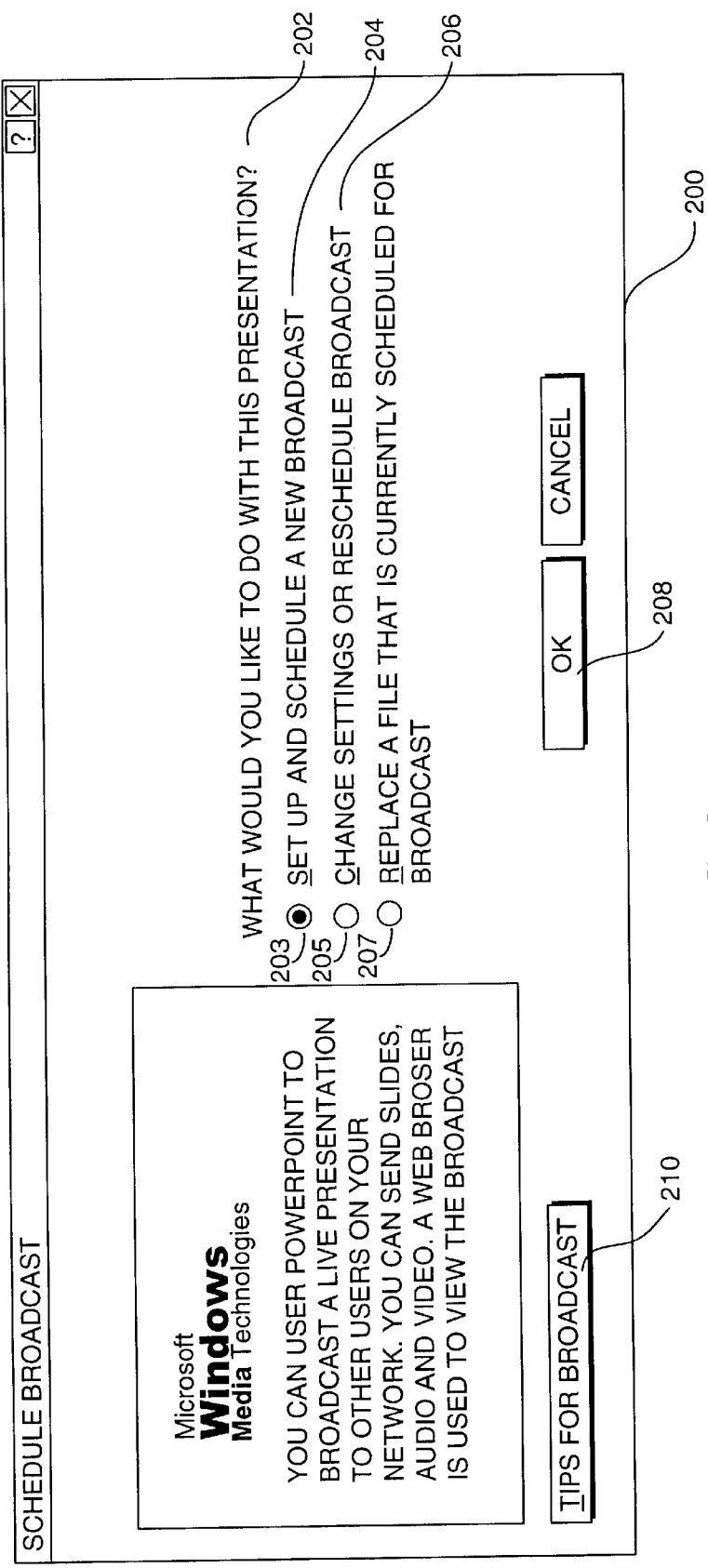
FIG. 3 is a dialog illustrating options that allow a user to schedule, reschedule, change, or replace a presentation broadcast in accord with one embodiment of the present invention.
Figure 4:
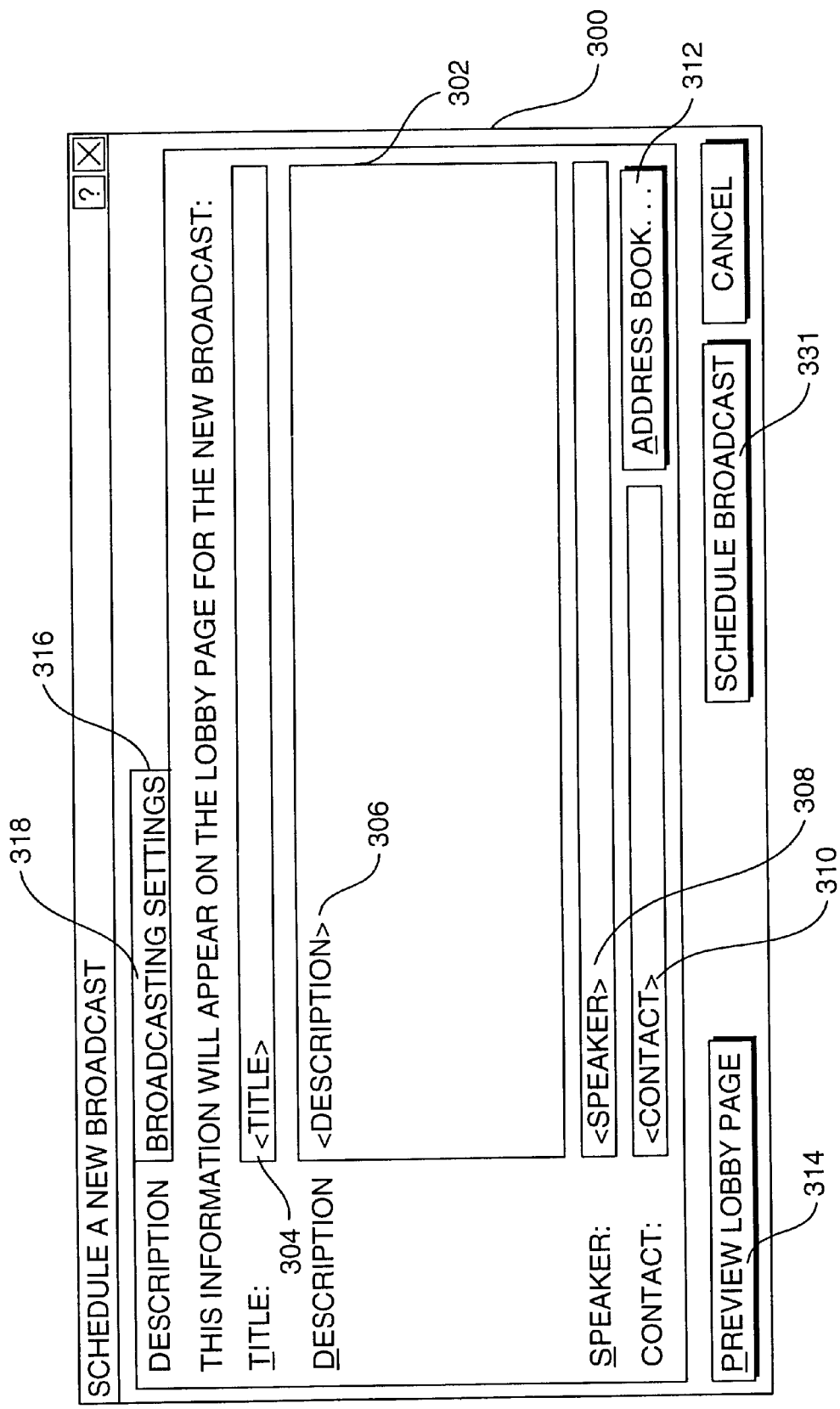
FIG. 4 is a dialog for entering a description and other information for a presentation broadcast.

To set up and schedule a new presentation broadcast, the user selects setup new option 202 and activates an OK button 208 as shown in FIG. 3, by either clicking on it while it is selected with a cursor using an input device such as a mouse, or activating the enter key on a keyboard when the OK button is highlighted (which occurs when one of the radio buttons 203, 205, or 207 is selected). This selection causes the logic to proceed to a block 114 in FIG. 1, which brings up a schedule information dialog 300, as shown in FIG. 4. With reference to FIG. 4, the user preferably first enters information concerning the presentation broadcast in appropriate fields of dialog 300. For example, the user would enter a title 304, a description 306 in a description form box 302, identify a speaker (or author) 308, and a contact 310.

The information entered into description form box 302 is subsequently used to automatically populate a "lobby" page and other tabs or pages used for scheduling purposes. The lobby page is a page that is presented at the start of the presentation broadcast that provides attendees with a summary of information concerning the presentation broadcast to allow each attendee to decide whether to attend (view) the presentation broadcast.

The default title entered for title 304 will be the name of the presentation broadcast that is currently active in POWERPOINT. The description field will preferably contain information that informs the viewers about the subject of the presentation broadcast, and may include an overview and/or agenda, an indication of where more information may be obtained, and other relevant data. The default speaker name and contact entered automatically will be the name and e-mail address of the current user running POWERPOINT. Any of the default information that is automatically entered can of course be changed by the user, as appropriate. The user can activate an address book button 312 to bring up an OUTLOOK address book and select contacts from entries in the address book to provide the e-mail address of the prospective attendees, or may manually enter an e-mail address for any prospective attendee.

If the user selects a preview lobby page button 314, the display focus will be switched to the browser (i.e., Microsoft's INTERNET EXPLORER), or the browser will be opened if it is not already open, and a lobby page will be created in a temporary directory and displayed on the browser. The preview lobby page button is used to illustrate how the presentation broadcast lobby page will appear when an attendee receives the broadcast of the presentation. In addition to the pre-populated information from the description form, the lobby page contains additional information, such as the start and end times (and dates) of the presentation broadcast (entered below). Since no time and date information has been entered at this point, the values for start and end times will be blank if the lobby page is previewed at this stage of the process.

Figure 5:
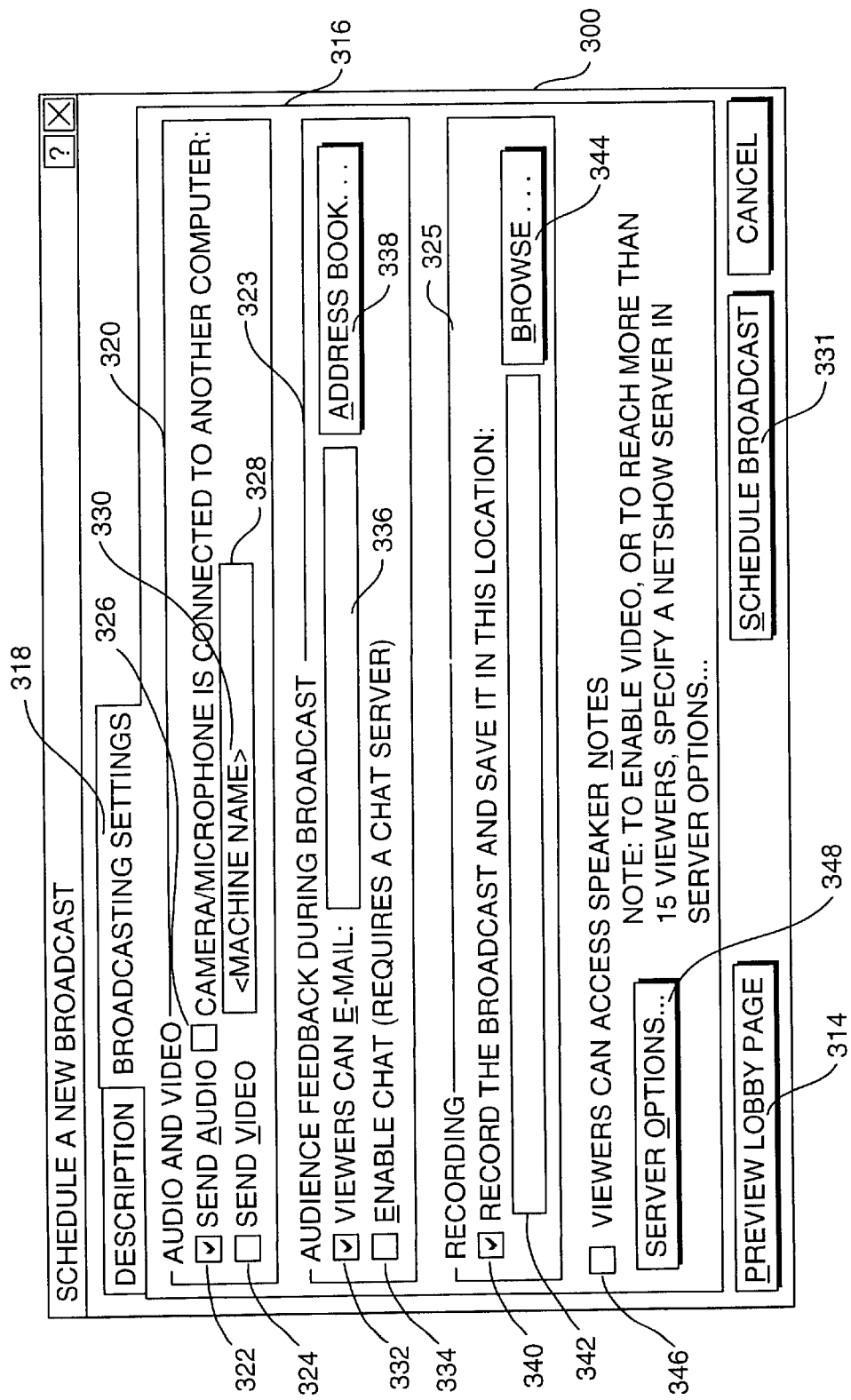
FIG. 5 is a dialog displaying exemplary presentation broadcast information.

Next, the logic flows to a block 116 (FIG. 1), which provides for entering information into a presentation broadcasting settings form 316, as shown in FIG. 5. The user selects a presentation broadcast settings tab 318 to switch the focus from description form 302 to the presentation broadcast settings form. The presentation broadcasting settings form allows the user to select or enter advanced settings, such as selectively determining whether audio and/or video will be transmitted during the presentation broadcast, determining whether and where the presentation broadcast will be archived, and specifying an audience feedback mechanism, etc. For organizations that want to monitor the network bandwidth required for such events, the administrator can selectively allow/disallow audio or video, limit bandwidth settings, and enable archiving on a per individual basis. This information is thereby provided to POWERPOINT so that the appropriate controls on the presentation broadcasting settings form are properly enabled or disabled. If willing to accept the default presentation broadcast setting (audio only), the user need not open the presentation broadcasting settings form. The presentation broadcasting settings form includes several other sections, including an audio and video section 320, an audience feedback section 323, and a recording section 325.

In the audio and video section, the user enters information identifying the type of media that is to be included in the presentation broadcast and the computer from where the presentation broadcast will be transmitted over the network. Audio and video section 320 includes a send audio checkbox control 322, a send video checkbox control 324, and a camera/microphone checkbox control 326, which has an associated machine name edit field 328. The default is for send audio checkbox control 322 to be checked and both send video checkbox control 324 and camera/microphone checkbox control 326 to be unchecked. To send audio, the user's local computer must have a sound card with a microphone plugged into it. To send video, the user will need a video camera that is connected to a video capture board in the computer or some other appropriate video input device/port.

If both of the send video checkbox control and the camera/microphone checkbox controls are unchecked, then the NETSHOW buffer time should be reduced to 0 seconds, or as low as possible, assuming that a telephonic connection (i.e., an analog modem) is being used for transmitting the presentation broadcast over the network. (NETSHOW parameters such as the buffer time may be adjusted externally from POWERPOINT by the user or a network administrator.)

Camera/microphone checkbox control 326 is only enabled if at least one of the send audio or the send video checkboxes is checked. This checkbox is used if the presentation broadcast is to be a live presentation broadcast that requires a camera (for video content) and/or a microphone (for audio content) connected to another computer. If a camera and/or microphone is used, a machine name 330 must be entered into machine name field 328, which is only enabled if the camera/microphone checkbox control is checked. The machine name identifies the computer to which the camera and/or microphone is connected. The default for the machine name is taken from the operating system registry. If there is no registry entry, then the name of the computer currently being used for the indicated purpose should be entered. Preferably, the machine corresponding to the entered machine name should be pinged to make sure that a valid name has been specified. The pinging test is carried when the user presses a schedule presentation broadcast button 331 (see below). If the name cannot be thus validated, a modeless dialog box (not shown here) is displayed, containing the alert: "Could not find the computer named '<machine name>'." The computer that was identified in machine name field 328 may not be currently connected to the network, or the name or location may be incorrect. The alert also contains the prompt "Continue scheduling?" with corresponding "yes" and "no" buttons. Selecting the "no" button will bring the user back to the presentation broadcast settings form, with the focus in the machine name field.

The audience feedback section allows the user to specify how (or if) the audience can communicate with the user during or after the presentation broadcast. The most common means of communication is through e-mail. Optionally, the user can set up an IRC-compatible chat server, such as a Microsoft EXCHANGE™ chat server, which will allow the user and audience members to interactively communicate during the presentation broadcast.

The audience feedback section 322 comprises an e-mail checkbox control 332, and an enable chat checkbox control 334. The e-mail checkbox control also has an associated e-mail edit field 336. Viewers of the presentation broadcast are enabled to e-mail feedback during (or after) the presentation broadcast, or send and receive chat messages during the presentation broadcast if the user selects respective checkbox controls 332 and 334. The default is for both the e-mail checkbox control and the chat checkbox control to be unchecked. If the user checks the e-mail checkbox control, a default e-mail address reference for the current user is automatically entered into the e-mail field 336, but can be changed by the user. Choosing an address book button 338 will automatically check (validate) the value entered into the e-mail field to determine if it is a valid address. If no value is entered (or if the entered value cannot be validated), the users OUTLOOK address book will be opened to enable the user to select an e-mail address stored in the address book. If the user doesn't validate the e-mail entry with the OUTLOOK address book, it will be verified when the user presses schedule presentation broadcast button 331. If the entry cannot be validated, an alert (not shown) is displayed to inform the user of this problem. The user cannot proceed until a valid e-mail reference is entered.

The default for the chat checkbox control is that it remains unchecked. The chat feature requires a chat URL registry entry to be specified by the network administrator (performed externally from POWERPOINT). If this URL has not been specified, then the chat checkbox control is disabled.

The recording section of dialog 300 includes a record broadcast checkbox control 340, with an associated save location field 342. Selecting the record presentation broadcast checkbox tells POWERPOINT to record the presentation broadcast content (slides in an HTML format file and streaming audio and video content in an Advanced Streaming Format (ASF) file) for on-demand access. The user identifies a location in the save location field to indicate to the system where the presentation broadcast content is to be stored by activating a browse button 344. The browse button enables the user to identify the location by browsing the user computer's file system. Selecting the browse button automatically checks the record presentation broadcast checkbox control (if it isn't already checked). The save location field contains static text and may not be manually edited. The default save location is derived from the system registry as an option that has been specified for the presentation design application. This field specifies only the location of the archive, not the complete archive file name. When the archive is created, it will be named using the following format: <NAME><XXXXYYZZAABBCC>.asf where <NAME> is the file name and XXXX refers to the year, YY the month, ZZ the day, AA the hour, BB the minute, CC the seconds, e.g., My Presentation19990427080104.asf.

In addition, the presentation broadcasting settings form includes a speaker notes checkbox 346, which specifies whether attendees will have access to the speaker notes. If this option is selected, the speaker notes are saved with the HTML content of the presentation broadcast, to allow the audience to access the speaker notes when they browse the presentation broadcast. The default setting for this option is unchecked. The presentation broadcasting settings form may also include a note to inform the user to select a NETSHOW server to reach more than 15 viewers. This note is hidden if a NETSHOW server has already been specified by the user or by the network administrator.

Figure 6:
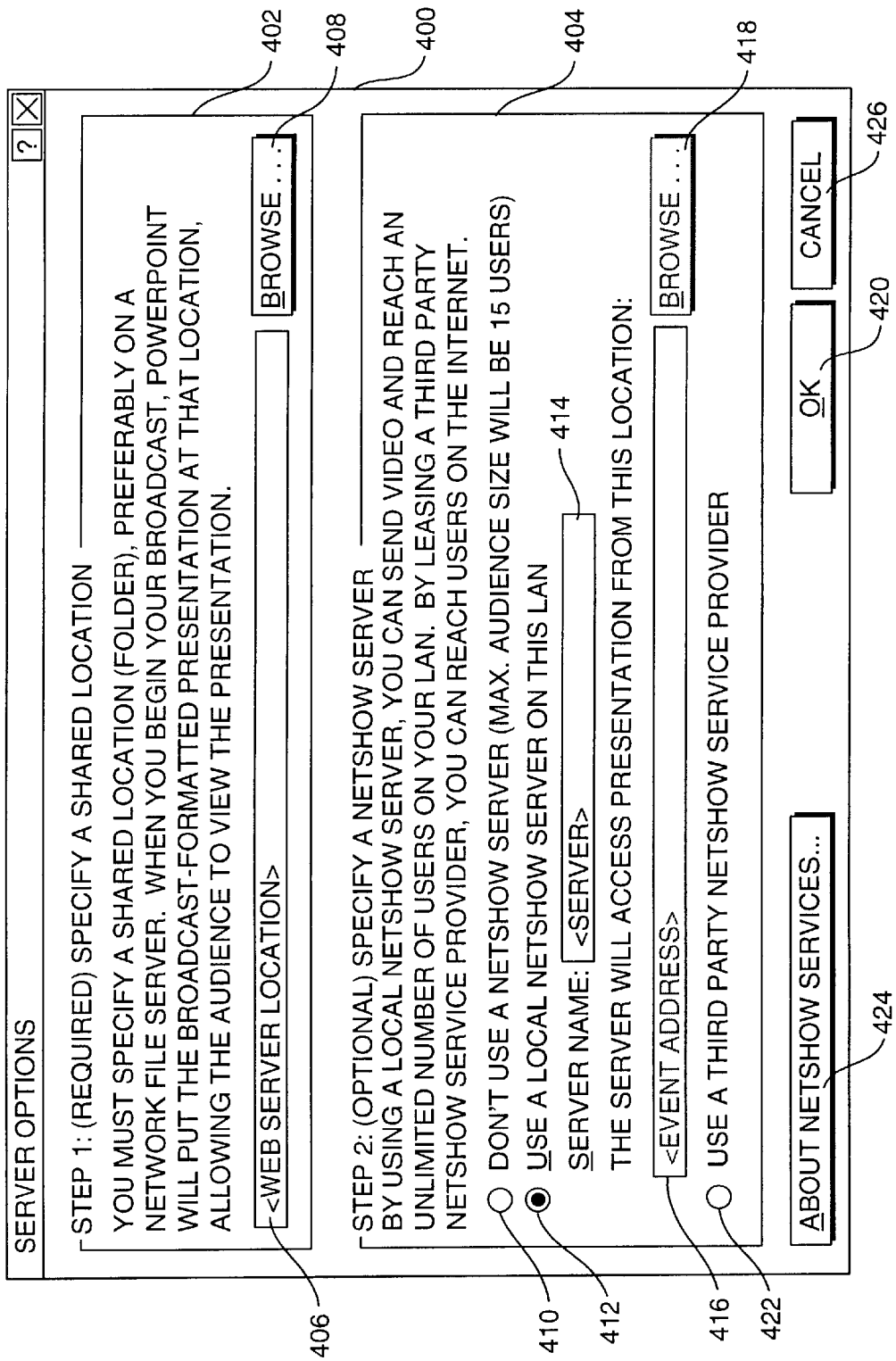
FIG. 6 is a dialog illustrating exemplary information entered for a server option used for the presentation broadcast.

Selection of a server options button 348 causes the logic to proceed to a block 118 (FIG. 1), which launches a server options dialog 400, as shown in FIG. 6. This selection does not dismiss the presentation broadcast settings dialog, which remains in the background. The server options dialog allows the user to override the preset default file locations and any preset or default NETSHOW server name. It will be necessary for the user to open this dialog if a network administrator is unavailable to modify these settings, or if the network administrator has not set up the NETSHOW server parameters. There may also be special cases where different file locations need to be used. In addition, multiple presentation broadcasts of the same presentation broadcast file can be scheduled by using the same file locations.

The server options dialog box comprises a required file server section 402, and an optional NETSHOW server section 404. Server section 402 includes a file server location field 406, and a browse button 408. The data in the file server location field identifies a shared location or directory, either on the user's local computer or a server, where POWERPOINT will store the HTML pages for the presentation broadcast. When attendees view the presentation broadcast, they will retrieve all the pages from this shared directory, so it is good practice to put these files on a server with adequate capacity for the files and capability to provide access by the expected audience. A default file server location is preferably provided in the registry of the local computer by the network administrator. The registry value will be of the form \\machine\user\presentation. Appended to this prefix will be the user name and a unique folder name. The string "presentation" is a resource that can be localized. The unique folder name is based on the current date in numeric form. If a folder corresponding to the current date already exists, a new folder is created by appending a numeral to it.

The second step for filling out the server options dialog is to specify a WINDOWS™ Media Services server (e.g., a server running Microsoft's NETSHOW™). There are three options available: (1) not to use a WINDOWS Media Service server; (2) to use a WINDOWS Media Service server, or (3) to outsource the hosting of the presentation broadcast to a third party WINDOWS Media Service Provider.

The user can select not to use a WINDOWS Media Service server by choosing a "don't use a NetShow server" radio button 410. If the user selects this option, the attendees will be connected to the host computer via the WINDOWS Media Encoder. The encoder is a feature of POWERPOINT that is incorporated in the program and provides direct streaming of audio/video content. This option will limit the live presentation broadcast of the presentation broadcast to an audience of up to 15 attendees. In addition, the extra overhead associated with streaming the audio/video content may slow down slide changes and animation during the presentation. Thus, if the presentation broadcast is to include live video content, it is preferable to use a WINDOWS Media Service server.

The user can select to use a WINDOWS Media Service server by choosing a "use a local NetShow server on this LAN" radio button 412. This selection will enable a server name field 414 to receive information. The server name field is an edit field that can be manually used to enter text to identify the local NewShow server that will be used. If the local NetShow server does not have access to the shared file location (i.e. Web server location 406), a server access location field 416 and its corresponding browse button 418 are enabled. The server location field is a static field that requires the use of browse button 418, which enables the user to browse the file system to select a location from where the WINDOWS Media Service server will access the presentation broadcast files. Preferably, the entered server name is validated when the user activates an OK button 420, which is used to indicate that the entry of server options information is complete. If the location/server name cannot be validated, an alert (not shown here) is displayed, indicating: "Could not find the computer named <server name>" "Continue anyway?", with corresponding "yes" and "no" buttons displayed. The selected computer may not be currently connected to the network, or the name may be incorrect. Selection of the "no" button will place the focus in the server name field. The NetShow server location should be created the same way that the file server location is created. A default value of the form \\netshow\user will be stored in the registry. The same username and folder name with date will be appended, as discussed above.

In addition to the actions taken above, the user (or network administrator) will need to create a presentation broadcast publishing point, and configure the server to stream the audio/video directly from the presenter's machine or the system running the WINDOWS™ Media Encoder.

If the user desires to broadcast the presentation over the Internet and doesn't have the bandwidth or servers available to handle the expected load, the user should select the option to use a third-party NETSHOW provider by choosing a "use a third-party NetShow service provider" button 422. No additional input concerning the third-party provider is necessary at this point—this information is subsequently entered.

The user may view information concerning using NETSHOW services by selecting an "about NETSHOW services" button 424, which will open the browser at a URL on the www.Microsoft.com domain that contains information about using NETSHOW™. Activation of a cancel button 426 returns the user to the presentation broadcasting settings form without saving the server options information. Activation of the OK button validates and saves the server options information and returns the user to the presentation broadcasting settings form. The default radio button setting for the NETSHOW options, along with the server name, and the server access location field value are preferably provided in the registry by the network administrator, so that the user doesn't have to manually select and/or enter this information.

Once the information fields of the description form have been completed, the user may select schedule presentation broadcast button 331 to schedule the presentation broadcast. Optionally, if the server option file server settings have been properly configured (by the user or by a network administrator), and a NETSHOW server has been selected, then entry of the schedule dialog is not necessary, and a new meeting request form is launched upon activation of the select presentation broadcast button. If the file server information has not been set, then the server options dialog will be displayed. The user will need to enter the file server information at this time.

Figure 2:
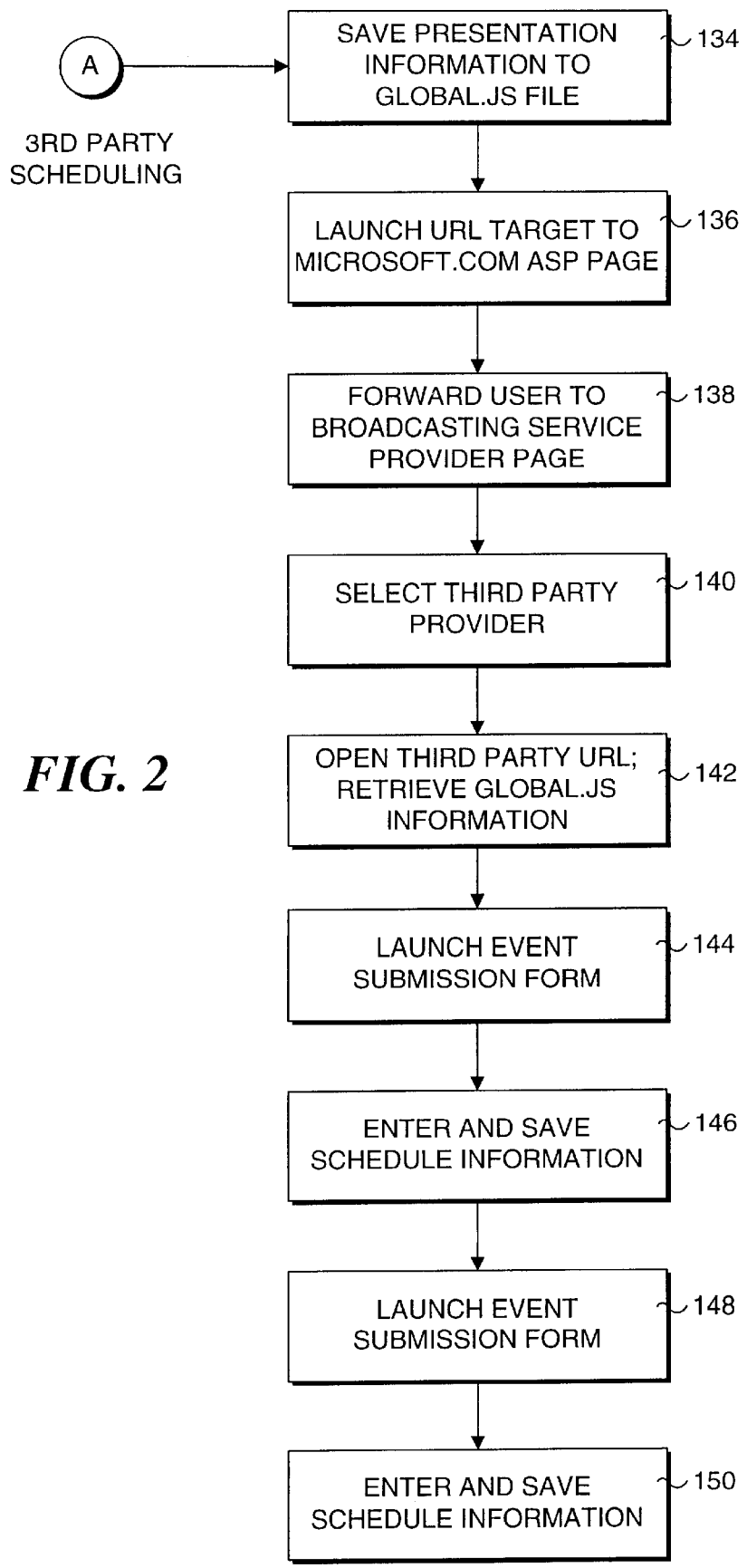
FIG. 2 is a flowchart illustrating the logic employed when scheduling a presentation broadcast that will be presentation broadcast using a server of a third party provider.

The logic proceeds to a decision block 119 (FIG. 1), where a determination is made to whether "use a third-party NetShow service provider" button 422 was selected in the server options. If the "use a third-party NetShow service provider" button was selected, the logic proceeds to a third party scheduling section, as shown in FIG. 2 (see discussion about third party scheduling below). Otherwise, the logic determines if a non-NETSHOW server was selected under the File Server options. If so, the following alert will be displayed to the user: "A maximum of 15 attendees will be able to watch the live presentation broadcast unless you specify a NetShow server. Would you like to continue without a NetShow server?" and "yes" and "no" buttons will be provided. Selection of the "yes" option launches the meeting request (see below). Selection of the "no" option returns the user to the schedule dialog and launches the server options dialog.

Figure 7:
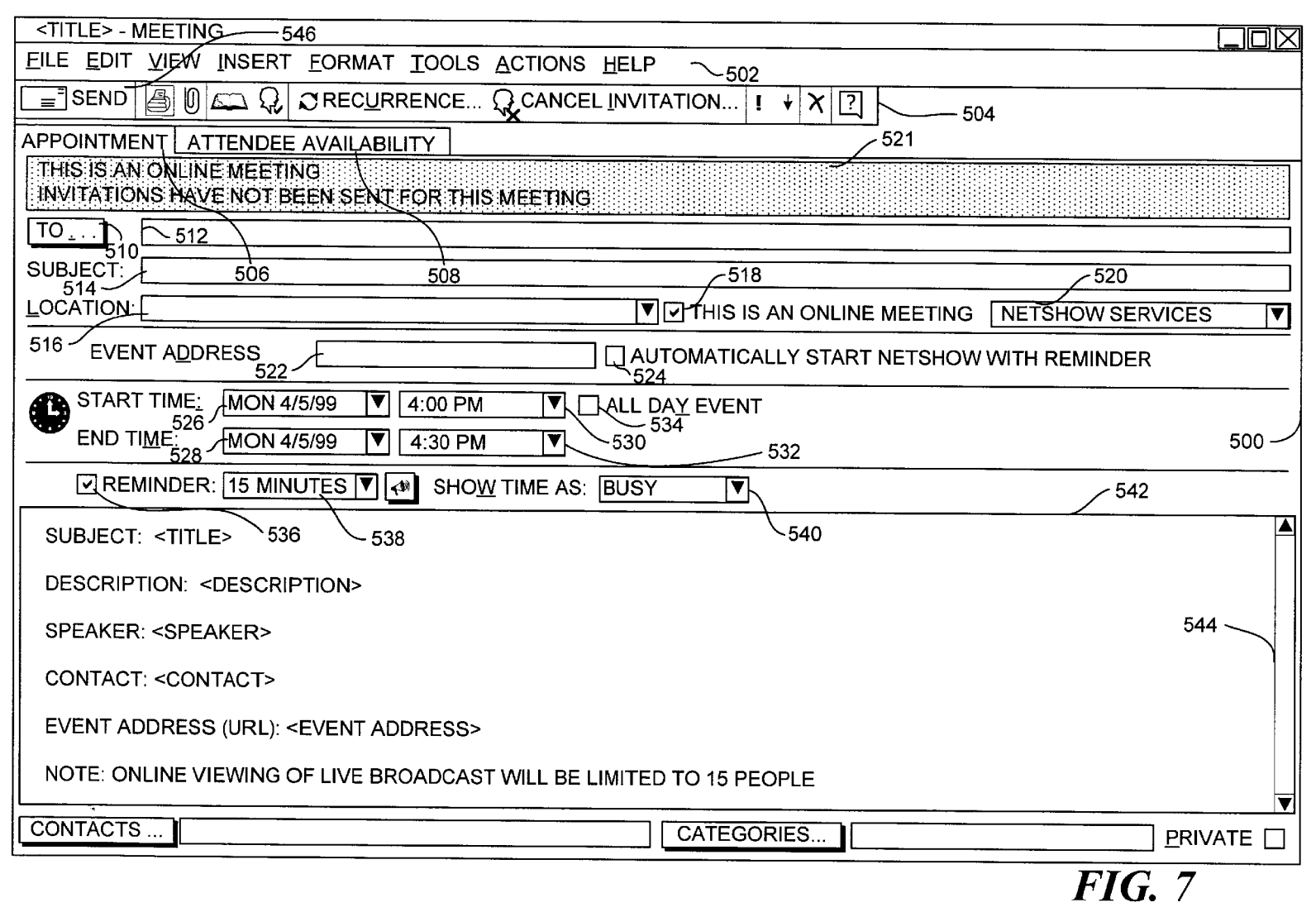

Returning to FIG. 1, the logic next flows to a block 120, which launches a meeting request dialog 500 in the OUTLOOK™ program, as shown in FIG. 7. The meeting request dialog comprises a modeless window having a top-level text menu 502, and an icon menu bar 504. The meeting request dialog also includes an appointment form 506, and an attendee availability form 508. The appointment form is the first form displayed by default when meeting request dialog 500 is launched. The appointment form includes a header section with a "to . . . " recipient button 510 and an associated recipient list field 512, a subject field 514, a location field 516, an online meeting checkbox control 518, and a "meeting type" pulldown menu 520. The header section may also contain a user-notification message area 521.

Immediately below the header is an event address field 522 and an "automatically start NetShow" checkbox control 524. The appointment form also includes a section for entering start and end times and dates for the presentation broadcast, including a start date pulldown control 526, an end date pulldown control 528, a start time pulldown control 530, and an end time pulldown control 532. Adjacent to these pulldown controls is an "all day event" checkbox control 534.

The next section of appointment form 506 contains a reminder checkbox control 536, and an associated reminder pulldown control 538. This section also includes a "show time as" pulldown menu 540. The appointment form also includes a description edit box 542, with scrolling controls, as necessary.

Many of the fields on the appointment form will already be completed, based on the information that was entered in the presentation broadcast schedule and server options dialogs. For example, the description edit field will already be completed with information concerning the presentation broadcast that was entered in the schedule dialog, including the title, description, speaker, contact, and other information, as applicable, based on the server options previously selected. Subject field 514 will contain the presentation broadcast title, while location control 516 will already be completed with the location of the presentation broadcast as entered in the presentation broadcast schedule discussed above. Additionally, the URL property in the OUTLOOK™ program will be set so that the browser will automatically be launched by the OUTLOOK program if installed on any of the remote computers of the attendees. The online meeting checkbox 518 will automatically be checked, and the "meeting type" pulldown menu control will default to the meeting type selected above, e.g., it will display "NewShow Services" if a NETSHOW server was previously selected.

The user must identify who is prospectively invited to attend (view) the presentation broadcast by filling in the message recipient list field. The user may manually enter attendees into the message recipient list field, or click on the "to . . . " recipient button to bring up an address book from within OUTLOOK, from which the desired attendees can be designated. The user may enter a single recipient, multiple recipients, or choose one or more predefined lists of recipients, such as all employees of a corporation above a specific management level or in a specific workgroup. OUTLOOK also allows the user to specify required and optional attendees. The user may optionally click on the attendee availability tab to bring up a form containing schedule information pertaining to the attendee(s) that were identified in recipient list field 512. This feature is standard in OUTLOOK and need not be further discussed herein. Note that by their nature, multicast events are accessible by anybody who knows the uniform resource locator (URL) for the presentation, which contains an IP address. Uninvited attendees can thus tune in to the presentation broadcast, if they somehow learn of the event and the corresponding URL from which the presentation broadcast will be transmitted.

The start time will default to the next nearest one-half hour interval, while the end time will default to one hour later then the default start time. The end and start dates will also default to the present date, unless the default start and end times fall on different dates. Each of the pulldown controls 526, 528, 530, 532 has a control value (the value that is displayed) and an associated pulldown menu for specifying this data. The user can either use the pulldown menus or manually enter time and date information into these controls.

The user may add additional information and/or replace the pre-filled information as desired, but it is preferable that the user not modify the pre-filled location and event address information. For example, the user can enter and/or modify the information in description edit box 542 by moving to the edit box and using standard editing techniques.

Once the appointment form has been filled out, the user can the send the message to the attendees by clicking on a send menu item 546 (either by clicking on the envelope icon or the "SEND" text). This action sends the message through OUTLOOK's normal message transmission services. The message can be received by both MAPI and non-MAPI clients, although it is preferable that the recipients are MAPI clients so that the may take advantage of all the built-in MAPI services provided by OUTLOOK. Just as for a conventional scheduled meeting message, the message will offer the recipient the choice of accepting the invitation or declining it.

In the event the user does not have OUTLOOK installed on the local computer, POWERPOINT will create a similar e-mail message using the user's default e-mail program. However, the option for scheduling the presentation broadcast in the presenter's calendar program (see below) will likely not be implemented with other e-mail programs.

When a recipient views a meeting request, a decision block 122 determines if the invitation to attend (view) the presentation broadcast has been accepted. The effectiveness of this query will depend on the capabilities of the recipient's e-mail service. For example, if the recipient accepts the meeting invitation and is using OUTLOOK or another MAPI-compliant service that provides the same object model as OUTLOOK, the time and date information in the meeting request message can be parsed to automatically create a meeting entry and reminder (if applicable) in the recipient's online calendar, as described below. If the recipient chooses not to attend the meeting, then no further action is taken.

Figure 8:
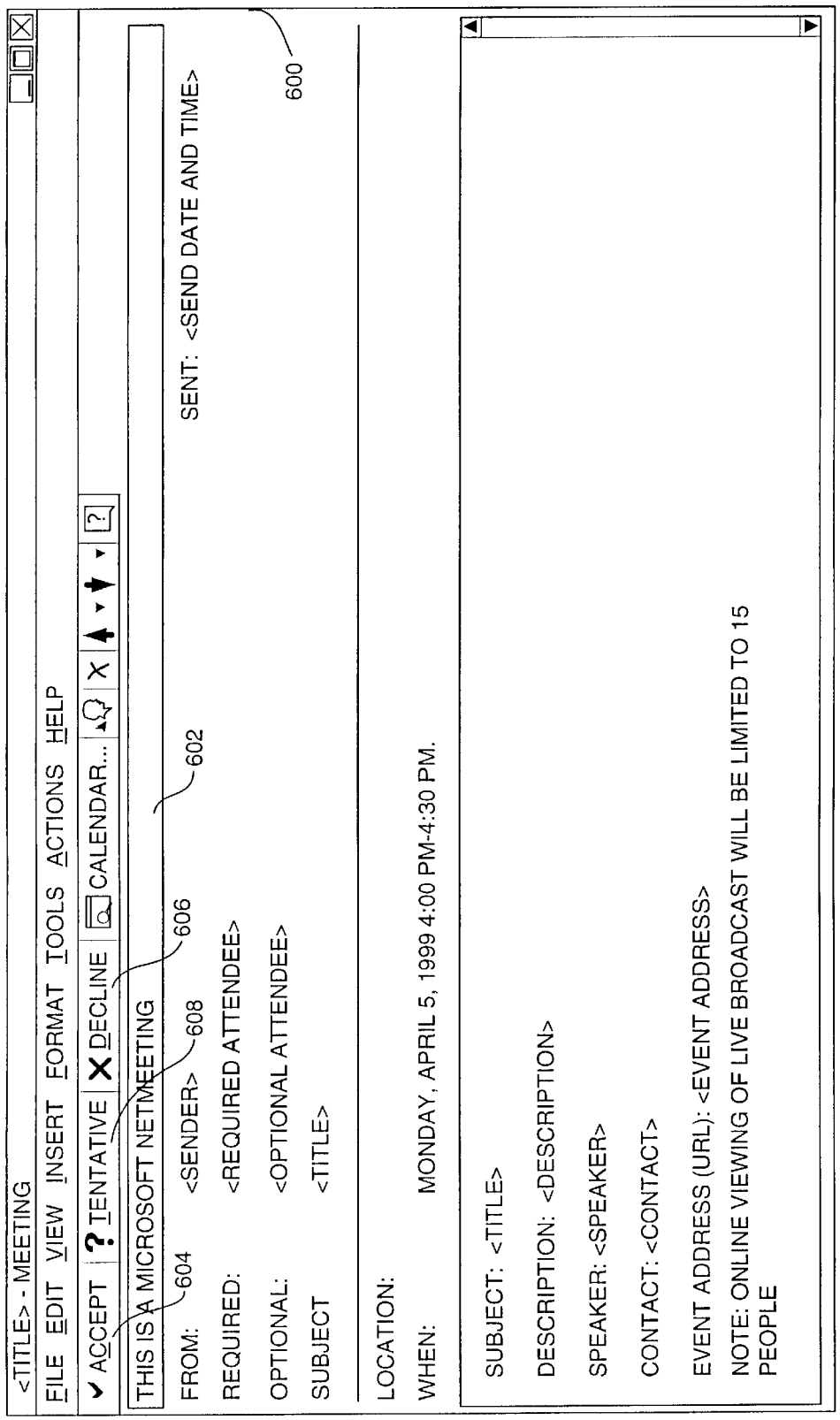
FIG. 8 is a dialog of an exemplary meeting invitation that is displayed in an attendee's calendar program upon receipt of a meeting request produced with the dialog of FIG. 7.

If the recipient is using OUTLOOK for viewing e-mail, a meeting invitation 600 similar to that shown in FIG. 8 will be displayed. The meeting invitation is similar to a conventional OUTLOOK meeting invitation, except for the addition of an information bar 602, which contains information about the meeting, such as "This is a Microsoft Netmeeting," or "this is a Microsoft NETSHOW." The information bar lets the recipient know that this is a meeting which can be "attended" from a remote location. The meeting invitation also includes various information fields containing data that was entered in meeting request dialog 500.

A recipient using OUTLOOK can choose to accept, decline, or tentatively schedule the presentation broadcast by respectively selecting an accept menu option 604, a decline menu option 606, or a tentative menu option 608, as provided in logic block 122 in the flowchart of FIG. 1. If the decline menu option is selected, no further action is taken, as discussed above. If the accept menu option is selected, the presentation broadcast event is scheduled into the user's calendar in OUTLOOK (as noted in a block 124 of the flowchart in FIG. 1), and a meeting reminder is stored (as provided in a block 126). If the tentative menu option is selected, the event is tentatively scheduled in the user's calendar in OUTLOOK.

At the time the meeting request message is sent, all of the settings in the schedule dialog are written to a buffer so that the information will be saved into the presentation broadcast when the presentation broadcast is next saved. The data that will be saved include the title, description, speaker, contact, audio and video settings, the camera and/or microphone source, feedback settings, archive settings, speakers notes setting, file server, URL, NetShow server settings, start time, and end time. This information is also saved as a text file in the same directory as the lobby page, under the filename "global.js." However, the attendee list isn't stored in the POWERPOINT presentation broadcast file or the global.js file, but rather is stored in OUTLOOK. POWERPOINT can retrieve the information in the attendee list by using the OUTLOOK mail ID corresponding to the e-mail message sent to the attendees. This mail ID is saved in the POWERPOINT file. Also, at this time, the lobby page will be created in the appropriate location and filled with all of the appropriate information, as discussed above.

In addition, when the meeting request message is sent, the schedule information is automatically entered into the user's calendar in OUTLOOK so that the user will be reminded to start the presentation broadcast at the proper time. A reminder is automatically scheduled into the calendar to appear 30 minutes before the scheduled start time, to prompt the user to initiate the presentation broadcast in a timely fashion.

The meeting message information, along with the URL and presentation broadcast file name, are stored in OUTLOOK. The mail ID is used as a unique id into the presentation broadcast and the calendar so that they can be matched at a later time to make sure that they are synchronized. As discussed above, the URL and presentation file should be unique.

If the presentation broadcast file has not yet been saved, then the name of the POWERPOINT presentation file (i.e., filename.ppt) will not be written into the calendar. This result would be occur if the presentation broadcast is currently being edited and is not in its final form. The only effect of omitting the presentation file is that OUTLOOK will not automatically start POWERPOINT when a meeting reminder is issued (see below).

Figure 9:
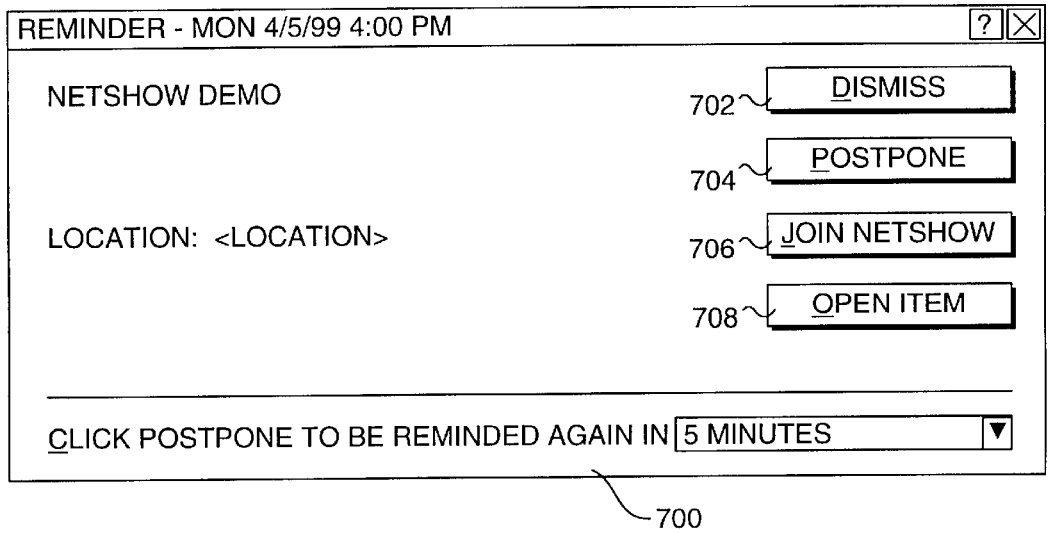
FIG. 9 is a dialog showing an exemplary presentation broadcast reminder that is displayed to a presentation broadcast attendee prior to the start of a scheduled presentation broadcast.

If the message was sent requesting the reminder notice, the flowchart logic proceeds to a block 128, wherein the prospective attendees using OUTLOOK™ and who have accepted the meeting request will be reminded of the upcoming presentation broadcast at a time equal to the value entered into pulldown control 538 of the appointment form (FIG. 7), using a reminder dialog 700 shown in FIG. 9. A default reminder time is 15 minutes prior to the start of the scheduled presentation broadcast. The reminder dialog includes a dismiss button 702, a postpone button 704, a join NETSHOW button 706, and an open item button 708. Users can manually join the presentation broadcast by activating the join NETSHOW button, whereupon the event address that represents the default page in the presentation broadcast folder is launched in the attendee's browser. The default page, "default.htm," contains code to redirect the browser to another page (the lobby page, lobby.htm), which allows the user to automatically download all of the necessary software for viewing. (The viewer will need to have the WINDOWS media player installed on the computer used to view the presentation broadcast—if it isn't already installed, it can be downloaded from lobby.htm.)

As discussed above, prospective attendees that do not use OUTLOOK can still receive meeting invitations via e-mail. In this case, each recipient will have to manually enter the time and date information for the meetings into their calendars, unless their e-mail application supports the ICal feature (a generic Internet Calendar format for exchanging calendar information between systems). If the e-mail application supports the ICal, the scheduling information can be automatically added to a recipient's calendar. At the time of the meeting, the attendees will need to manually start their browsers by using the URL that is provided with the meeting invitation. For prospective attendees who don't use OUTLOOK for their e-mail program, the invitation mail will have a hyperlink that can be selected by the recipient to view the presentation broadcast. Clicking on the hyperlink will take the attendee to a web page from where the presentation broadcast can be viewed.

Changing Broadcast Settings and Rescheduling a Broadcast

Figure 10:
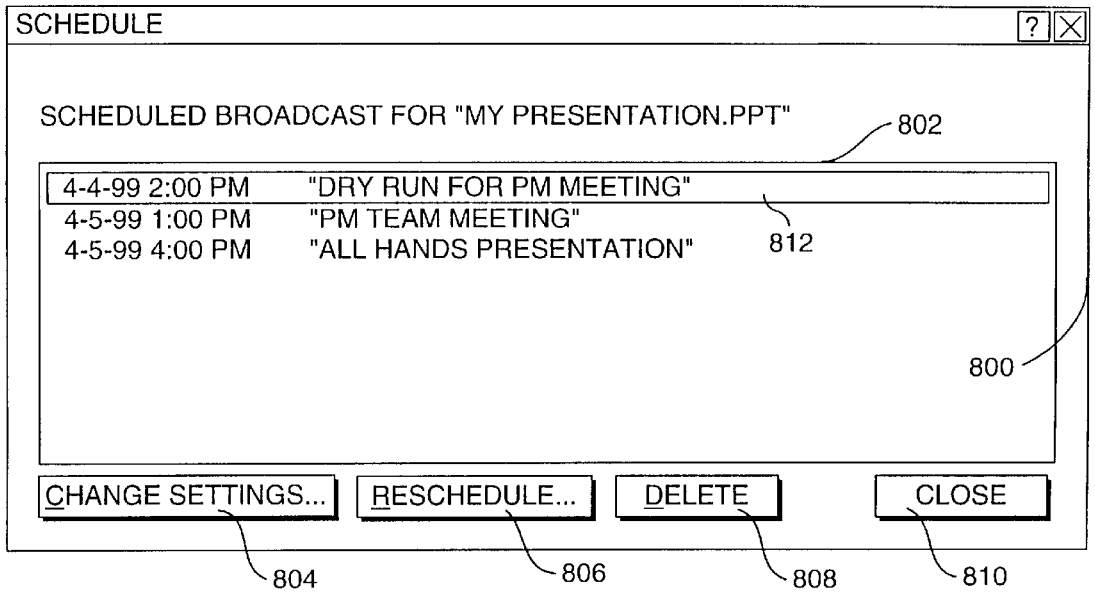
FIG. 10 is a dialog used for changing the settings of a presentation broadcast or rescheduling a presentation broadcast.

As discussed above, schedule presentation broadcast dialog 200 (FIG. 3) includes change settings option 204 for use in changing settings or rescheduling a presentation broadcast. The user can choose to change the settings of an existing presentation broadcast or reschedule an existing presentation broadcast by activating the change settings radio button, which causes the flowchart logic to proceed to a block 130 (FIG. 1). As a result, a schedule dialog 800 is displayed, as shown in FIG. 10. The schedule dialog includes a selection list 802, a change settings button 804, a reschedule button 806, a delete button 808, and a close button 810.

The user first selects a scheduled presentation broadcast from selection list 802, which will include a list of events that have been saved with the current presentation broadcast, such as a "dry run for pm meeting" 812 shown in this example. If the user chooses the change settings button, schedule information dialog 300 is brought up (FIG. 5). The schedule information dialog is the same as discussed above, except that the "schedule presentation broadcast" button is replaced by an "update" button. The user can change the settings in both description form 302 and presentation broadcasting settings form 316, as well as the settings in the server options dialog. Activation of the "update" button causes the Lobby Page to be regenerated (in the background) and saves any changed information to the presentation broadcast file. Note that the URL cannot be changed—it's already been sent out in the meeting request e-mail messages. Therefore, this field is disabled or grayed in the server options dialog.

Selecting reschedule button 806 brings up a reschedule dialog 900, as shown in FIG. 11, which corresponds to the conventional OUTLOOK dialog for changing a meeting time and sending updates. Reschedule dialog 900 is substantially similar to meeting request dialog 500, except for some minor changes to the underlying pulldown menu items of the top level text menu and the icon menu bar. The information in the edit fields is the same as was entered when the meeting request information was originally completed. The reschedule dialog's icon menu bar now includes a "save and close" menu item 904, a "send update" menu item 906, and a "view NETSHOW" 908. In addition, the icon menu bar includes an "invite attendees . . . " menu item 910, which is disabled or grayed. The user can modify the start and end times and dates as desired. The other information in the reschedule dialog may also be modified, but it is preferable to not change the event address or location. Activating the "save and close" menu item saves the updated information to the POWERPOINT presentation broadcast file. Activating the "send update" menu item sends the rescheduled meeting request to the prospective attendees previously identified. The dialog may also include a notification 912, such as the message "this is an online meeting . . . no responses have been received for this meeting." The notification lets the user know if any prospective attendees that received the invitation to attend within OUTLOOK have scheduled the meeting based on the previously-sent information in the meeting request.

The user can also reschedule the meeting without using POWERPOINT, by directly using OUTLOOK™ and changing the meeting times (by dragging the meeting icon or by using the meeting planner dialog). In this case, POWERPOINT will not be advised of the new scheduled time. The user will also need to adjust the time of the presentation broadcast within POWERPOINT by selecting the Broadcast→Begin menu item and then modifying the start and end times to agree with the times on the calendar. The user can manually start the presentation broadcast at the correct time, irrespective of the time entered in POWERPOINT.

Referring back to FIG. 10, activating delete button 808 will delete the presentation broadcast information from POWERPOINT. If the meeting occurred in the past, nothing more happens. If the presentation broadcast will occur in the future, the user is alerted that a presentation broadcast that has already been scheduled is about to be cancelled. Selecting a "yes" in response to this alert will delete the presentation broadcast presentation broadcast meeting entry from the user's calendar, and remove the presentation broadcast information from the POWERPOINT file. If the user chooses to delete the meeting, OUTLOOK will automatically send a cancel message to the attendees identified in the recipient list.

Replacing a Broadcast File

Figure 12:
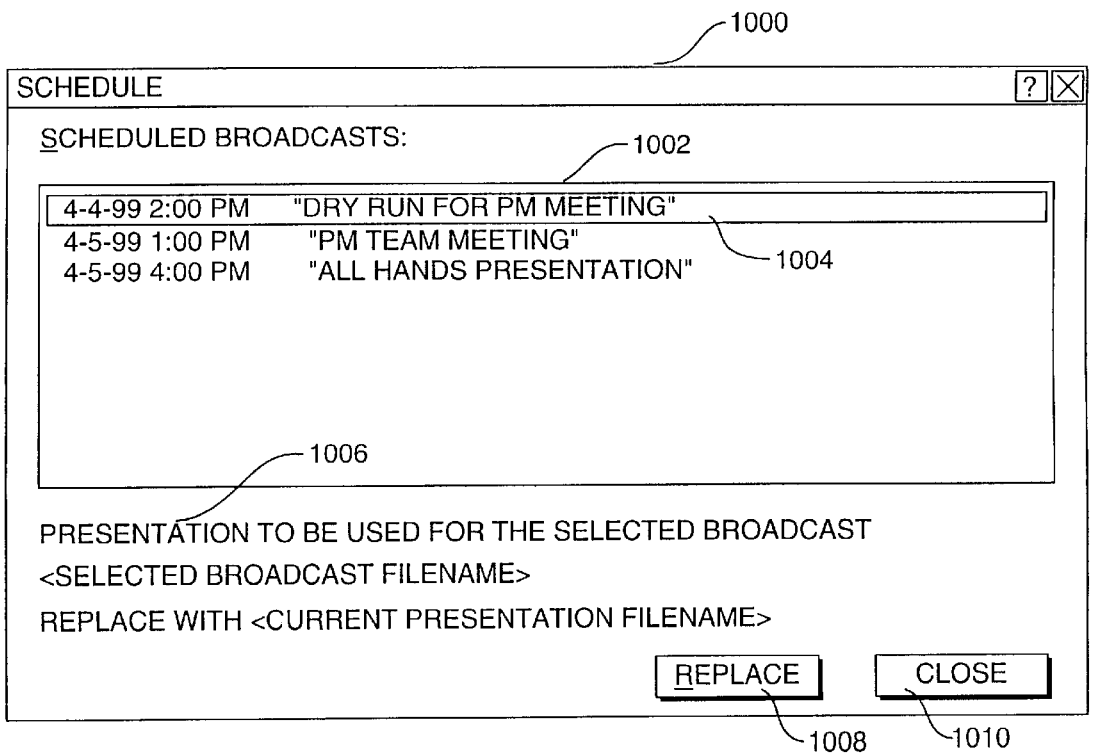
FIG. 12 is a dialog used for replacing a scheduled presentation broadcast with a new presentation broadcast.

Referring to FIGS. 1 and 3, the activation of replace option 206 in schedule dialog 200 allows the user to replace an original presentation broadcast file with a new presentation broadcast file, causing the logic to move to a block 132 in the flowchart. Upon activation of the replace option, POWERPOINT displays a replace presentation broadcast dialog 1000, as shown in FIG. 12, and searches the user's calendar for scheduled presentation broadcasts. POWERPOINT then displays a list of presentation broadcasts that the user has initiated, in a list control 1002. This list control will not include presentation broadcasts that the user did not initiate, but was invited to attend. The presentation broadcast file name is used to filter the list, and the list will preferably be sorted based on the start time of the presentation broadcasts, if more than one presentation broadcast is found. Broadcast events that have already occurred are not shown in the list.

The user selects one of the scheduled presentation broadcasts in the list, such as a "dry run for PM meeting" 1004, whereupon a notification text 1006 is displayed that identifies the names of the presentation file for the selected broadcast and the replacement presentation file. Activating a replacement button 1008 attaches the replacement presentation file to the selected broadcast. The new replacement presentation file name will then be written into the calendar item. The existing presentation information will then be extracted from the original presentation broadcast, or copied from the global.js file if the original presentation broadcast cannot be found or the information is missing from the original presentation broadcast. This presentation broadcast information will also be written into the replacement presentation. Additionally, the start and end times stored in the replacement presentation are compared with the start and end times entered in the OUTLOOK calendar. The replace presentation broadcast dialog remains open until a close button 1010 is selected.

Scheduling an Internet NETSHOW Presentation Broadcast

The user may desire to use an Internet server running NETSHOW leased from a third party to broadcast the presentation to allow the presentation to be broadcast over the Internet to anyone who has access to the NETSHOW server. The user can choose to use a third party NETSHOW provider by selecting "use a third-party NETSHOW service provider" button 422 on the server options dialog (FIG. 6) when entering the server options information. The user will select OK button 420, which opens schedule information dialog 300 and will then select schedule presentation broadcast button 331, as before, to schedule the presentation broadcast.

With reference to FIG. 1, if a third party provider was selected under the server options, the answer to decision block 119 is yes, and the logic proceeds to the third party scheduling logic flowchart shown in FIG. 2. In a block 134, the presentation broadcast information for the lobby page is generated and stored in the global.js file. This file contains all the information necessary to broadcast the presentation, except for scheduling information that is entered later (see below). The information includes a file server location (FileServerLoc) that identifies where the HTML files for the presentation are stored.

Next, a block 136 switches the user's opens INTERNET EXPLORER™, which launches an initial URL that targets an Active Server Page at Microsoft.com, redirecting the browser to a NETSHOW™ presentation broadcasting service provider page through Microsoft.com's Active Server Pages (ASP) architecture, as indicated by a block 138. The initial URL is stored in the system registry on the user's local computer when the presentation broadcasting files of POWERPOINT are installed (these files are optional, and may not be included in typical POWERPOINT installations) under an appropriate key.

The URL that is used to launch the ASP page at Microsoft.com contains embedded information that a control on the ASP page deciphers so the further processing can be performed. The embedded information includes the location of the global.js file, the LCID (a language identifier, e.g., 1033 for English), and the status of the request from POWERPOINT. The form of the URL is as follows:

http://officeupdate.microsoft.com/office/ redirect /fromOffic9/PresBroadcasting.htm?DPC= % ProductCode%&DCC=%AppComponentCode %&AppName=%ApplicationName%&HelpLCID= %LCID%&FileServerLoc="<FileServerLoc>"&Status= "<Status>"

e.g., http://officeupdate.microsoft.com/office/ redirect/fromOffic9/PresBroadcasting.htm? D PC=%ProductCode%&DCC=

%AppComponentCode%&AppName=%Application
Name%&HelpLCID="1033"&FileServerLoc=
"\\myserver\user\myname\MyPresentation199904270801
04"&Status="Schedule"

The values of DPC, DCC, and AppName are all Microsoft related information. The values for Status are "Schedule", "Update", "Begin", and "Delete."

The NETSHOW™ presentation broadcasting service provider page contains information concerning NETSHOW™ presentation broadcasting, including a list of links to third party NETSHOW server providers. These third party providers are partners with the Microsoft Corporation, providing hardware and software services that allow companies and individuals to lease access to NETSHOW servers. The list of links presented to the user will depend on the LCID value, so that the listed third party providers are somewhat localized to the user. For instance, if the LCID value corresponds to German, a list of German third party providers will be presented to the user. The logic next proceeds to a block 140 (FIG. 1), wherein the user chooses one of these links to select a third party provider.

Selection of a third party provider creates a URL that launches a web page corresponding to the selected third party provider, as shown by a block 142. The URL contains embedded information that is used by a control on the third party provider's web page to receive the file server location, LCID, and status. The URL will be in one of the following forms, depending on whether its corresponding web page is to be used for scheduling or broadcasting a presentation.
http:/www.<3rdparty>.com/schedule.htm?HelpLCID=
   %LCID%&FileServerLoc="FileServerLoc>"&Status=
   "Schedule"
http:/www.<3rdparty>.com/broadcast.htm?HelpLCID=
   %LCID%&FileServerLoc="FileServerLoc>"&Status=
   "Begin"
e.g.,
http:/www.<3rdparty>.com/schedule.htm?HelpLCID=
   "1033"&FileServerLoc="\\myserver\user\myname\
   MyPresentation199904270801 04"&Status="Schedule"
http:/www.<3rdparty>.com/broadcast.htm?HelpLCID=
   "1033"&FileServerLoc="\\myserver\user\myname\
   MyPresentation199904270801 04"&Status="Begin"

In the case of scheduling a new broadcast, the Status value will be "Schedule," and the URL will target the schedule-.htm page one the third party's web server. In addition to the embedded information, the global.js file is also forwarded to the targeted web page, which can download the global.js file via a control (e.g., an FTP-type control) on the page or third party web site.

Each third party provider provides a web interface page containing an event submission form 1100, similar to that shown in FIG. 13, which will then be launched in a block 144 (FIG. 2). To schedule such a presentation broadcast, the user must inform the third party provider of the desired times and date and provide some of the presentation broadcast information generated above. The third party provider may provide user registration or user validation pages prior to presenting an event submission form to the user.

The event submission form includes a title field 1102, a description field 1104, a start date/time field 1106, an end date/time field 1108, a related URL field 1110, a location field 1112, and a contact's e-mail alias field 1114. The event submission form also includes a content type radio button group, comprising a "live" radio button 1116, an "on-demand" radio button 1118, and a "live with slides" radio button 1120. The information in the title, description, and location fields will already be completed with the presentation broadcast information previously entered above. The contact's e-mail alias defaults to the current user's e-mail alias, but can be changed. The user will have to enter the start time and date information, along with the end time and date information in a block 146. Optionally, a related URL, which may be used to display a web page that contains information concerning the presentation broadcast, can be entered. Upon completion of this dialog, the user selects a "submit event request" button 1122 to submit the request to the third party NETSHOW provider. The third party provider will then schedule a NETSHOW presentation broadcast based on the information provided in the event submission form.

It is likely that the particular field format and layout of each third party provider's event submission form will differ from the above example, and may request different or additional information, include other check boxes, radio buttons, and edit fields. For example, a third party event submission form may include information concerning presentation broadcast settings, such as an indication of whether audio and video are to be used, the types of viewer feedback that will be accepted, etc. The event submission form may also include leasing information, such as the number of viewers that may receive the presentation broadcast.

Once the event is submitted and accepted, in a block 148 of FIG. 2, the third party provider sends a control to the user's local computer so that POWERPOINT can properly transmit the presentation slides and streaming audio/video content to the third party provider during a live broadcast of the presentation. The control comprises a set of dynamic link libraries (.DLL files) that interface with POWERPOINT to provide the appropriate functionality. The user will be presented with a dialog asking whether to download the control, whereupon selection of the dialog's OK button by the user will initiate downloading of the control to the user.

After the third party control has been successfully downloaded, the third party provider preferably displays a web page that contains a URL at which the presentation broadcast will be viewed. The page preferably also display a list of instructions for performing the presentation broadcast, and a list of details concerning the presentation broadcast to verify that proper selections were entered in the event submission form.

As a preferred option, the third party provider will additionally provide an e-mail confirmation message to the user, containing the scheduling and selected presentation broadcast information, as indicated by a block 150 (FIG. 2). The user can then forward this e-mail message (or create a new message containing some or all of the information provided in the confirmation message) to the prospective attendees so that they can schedule the presentation broadcast, if they choose to attend.

The presentation broadcast can also be rescheduled in a similar fashion to that described above for rescheduling a presentation broadcast, except that the reschedule information is entered into a form provided by the third party provider. As before, the user reschedules a presentation broadcast by selecting the "Slide Show→Online Broadcast→Set Up and Schedule" menu option, and then selects the change settings button from schedule presentation broadcast dialog 200 (see FIG. 3). The user is then presented with a list of scheduled presentation broadcasts, as shown in FIG. 10, whereupon the user selects a scheduled presentation broadcast from the list and activates reschedule button 806. If the selected scheduled presentation broadcast was originally scheduled with a third party provider, the browser will open to Microsoft.com web page and use its ASP feature to forward the user to the page containing the list of links to third party providers. In this instance, the URL will contain information indicating that the user wishes to reschedule an existing presentation broadcast, rather than to schedule a new presentation broadcast.

The user will then select the third party provider previously chosen, whereupon the browser displays an entry page for the selected third party provider enabling the user to log into the provider's system. The user logs in and is forwarded to a reschedule form (not shown), which preferably is substantially similar to the event submission form. The user changes the scheduled start and end times, and activates a button to reschedule the presentation broadcast using the updated times. The third party provider will then preferably send an e-mail confirmation message containing the updated schedule, along with any updated presentation broadcast information.

Broadcasting the Presentation

Figure 14:
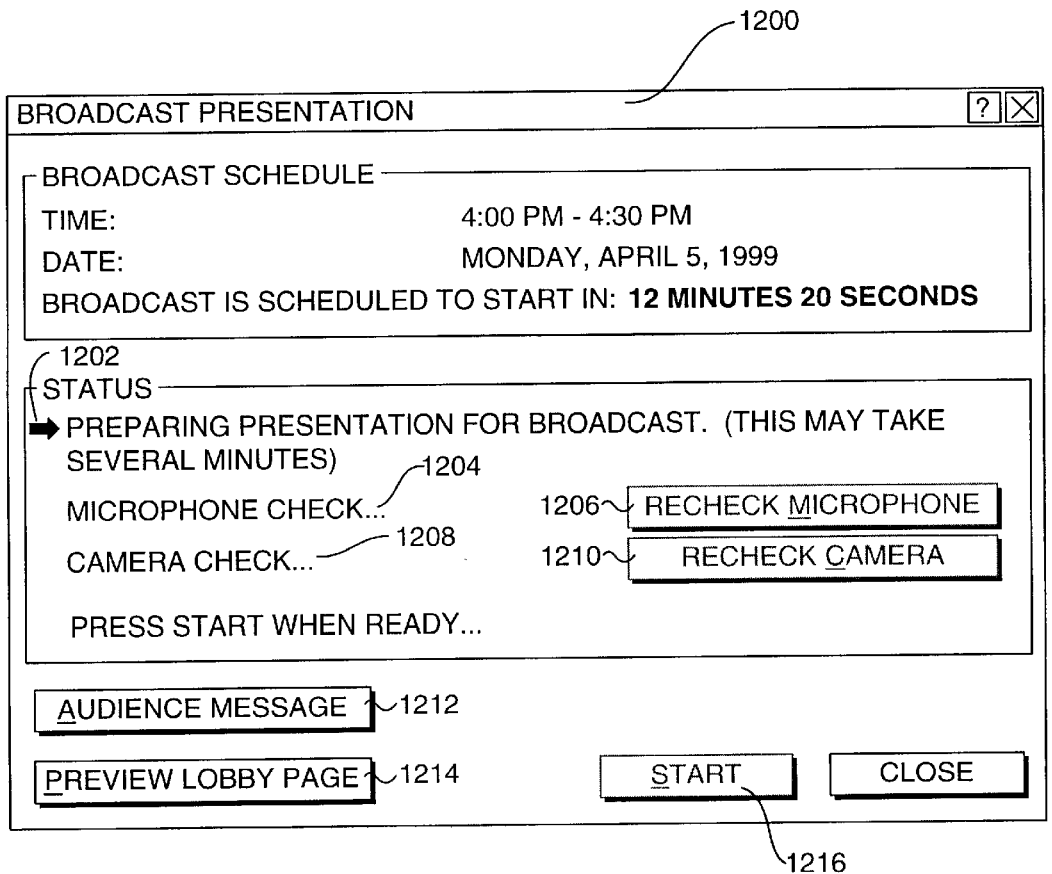
FIG. 14 is a dialog presented to a user at the start of a presentation broadcast.

A user initiates the broadcast of the presentation by selecting the "Slide Show→Online Broadcast→Begin Broadcast" menu selection from POWERPOINT's main menu. This action opens a presentation broadcast dialog 1200, as shown in FIG. 14. The system executes a series of checks to verify that all components are ready for presentation broadcasting, and the progress of the checks is indicated by an arrow 1202. The first check is a microphone check, which is used to check input from the microphone and to adjust its volume level, if necessary. This check will bring up a dialog (not shown), which contains a green progress bar (used to indicate a relative speech level) and a volume adjustment slide control. The user is prompted by the dialog to say, "I am using the microphone setup wizard. It is checking to see whether my microphone is plugged in and working properly." The user should speak at a normal level so that the system can adjust the volume level based on the peaks it measures when the user speaks the phrase noted above. The user should also verify that the green progress bar changes length when speaking. When the microphone check is complete, a check is placed next to "microphone check . . . " text 1204. The user may choose to recheck the microphone by activating a recheck microphone button 1206, which is disabled (grayed) until the original microphone check is completed.

If the user has indicated that video will be used (in the presentation broadcast settings dialog above), a video check dialog (not shown) is presented. The video check dialog allows the user to adjust the video image with various controls, including slider controls for brightness, contrast, saturation, hue, and gain. Another dialog concurrently presented includes the video image that is presently being received to enable the user to more easily adjust the video image controls. These adjustments will be limited by the raw data that is produced by the camera. After the user has adjusted the video controls, an OK button can be selected to return the user to the presentation broadcast dialog. A check is then placed next to "camera check . . . " text 1208 to indicate that it has been completed. The user may recheck the camera by activating a recheck camera button 1210, which will be disabled (grayed) until the initial camera check is completed.

The user may inform the audience if there are any problems encountered during the setup by activating an audience message button 1212, which enables the user to send one-line messages to the audience. The messages are posted on the lobby page, which may be previewed by selecting a preview lobby page button 1214. Details of how the system sends the audience messages are presented below.

After the checks are complete, the user can initiate the presentation broadcast by activating a start button 1216. This button is disabled until the system checks are completed. The broadcast begins by forwarding the HTML files and the streaming audio/video content that comprise the presentation directly to the audience computers (if a NETSHOW server was not selected), or to the selected NETSHOW server. The audio/video content is generated as the presentation broadcast is performed, in an Advanced Streaming Format (ASF) stream. If a NETSHOW server is being used (either on a local LAN or through a third-party provider), the NETSHOW server transmits the audio/video content of the presentation (that is has received from the presenter's machine) to the attendees via the ASF stream. The ASF stream contains embedded information to trigger the launching of the web pages (stored on the shared file location and corresponding to the presentation slides created in POWERPOINT) so as to be synchronized with the audio/video content. The attendees can view the presentation by linking their browser to the URL assigned for the presentation broadcast.

After the presentation broadcast is finished, the user can replay the presentation broadcast if he or she has selected the presentation broadcast to be saved (by previously checking the record presentation broadcast checkbox on the presentation broadcast settings form (FIG. 5)). To view the presentation broadcast, it is only necessary to access the URL that was provided in the e-mail meeting request or open the default.htm file from the previously-assigned directory.

Broadcasting via a Third Party NETSHOW Provider

The user again begins a third party NETSHOW™ provider presentation broadcast by selecting the "Online Broadcast→Begin Broadcast" menu item from the "Slide Show" top-level dropdown menu in POWERPOINT. At this point, POWERPOINT's user interface is suppressed, and the presentation broadcast slide files are saved as HTML files to the previously-selected presentation broadcast directory, the location of which was previously passed to the third-party provider through the global.js file. The third-party provider is then informed that the user wants to initiate the process for broadcasting the presentation, whereupon the third party provider uploads the HTML slide files for the presentation broadcast. The audio and video checks are then performed (as discussed above), and the user initiates the presentation broadcast by selecting the start button.

At this point the browser is launched with a Status= "Begin" query string so that the Microsoft.com ASP page can appropriately switch it's user interface and links to send the user to the third party provider's begin presentation broadcasting page. POWERPOINT then responds to a WINDOWS system message, 0x041E (1054 decimal), which is sent by the third party provider web page to signify that the provider is ready to begin the presentation broadcast. Upon receiving this message, POWERPOINT starts in presentation broadcast mode and begins streaming audio/video content to the third party via its internal WINDOWS Media Encoder. The third party broadcasts the HTML slides it has already uploaded in concert with the streaming audio/video content it receives in real time on the NETSHOW server to attendees who link their browsers to the URL assigned for the presentation broadcast. The streaming audio/video content contains embedded commands that indicate when individual slides should be displayed during the presentation broadcast. When the presentation broadcast is completed, a "SlideShow Ended" event is sent to the third party provider so that the provider can end the presentation broadcast.

Sending Audience Messages

As discussed above, the user may inform the audience if there are any problems or send other information by activating audience message button 1212 on the broadcast presentation dialog shown in FIG. 14. Activating this button will bring up a dialog, which provides an edit control that enables the user to write a message posted on the lobby page.

Normally, in order to pass a message to a loaded web page, a developer would merely have to pass the message to a Java or ActiveX control that is built into the web page. However, this function would require the audience members to use a browser that supports Java and/or ActiveX, which is undesirable. Thus, an alternative solution had to be developed.

Figure 15:
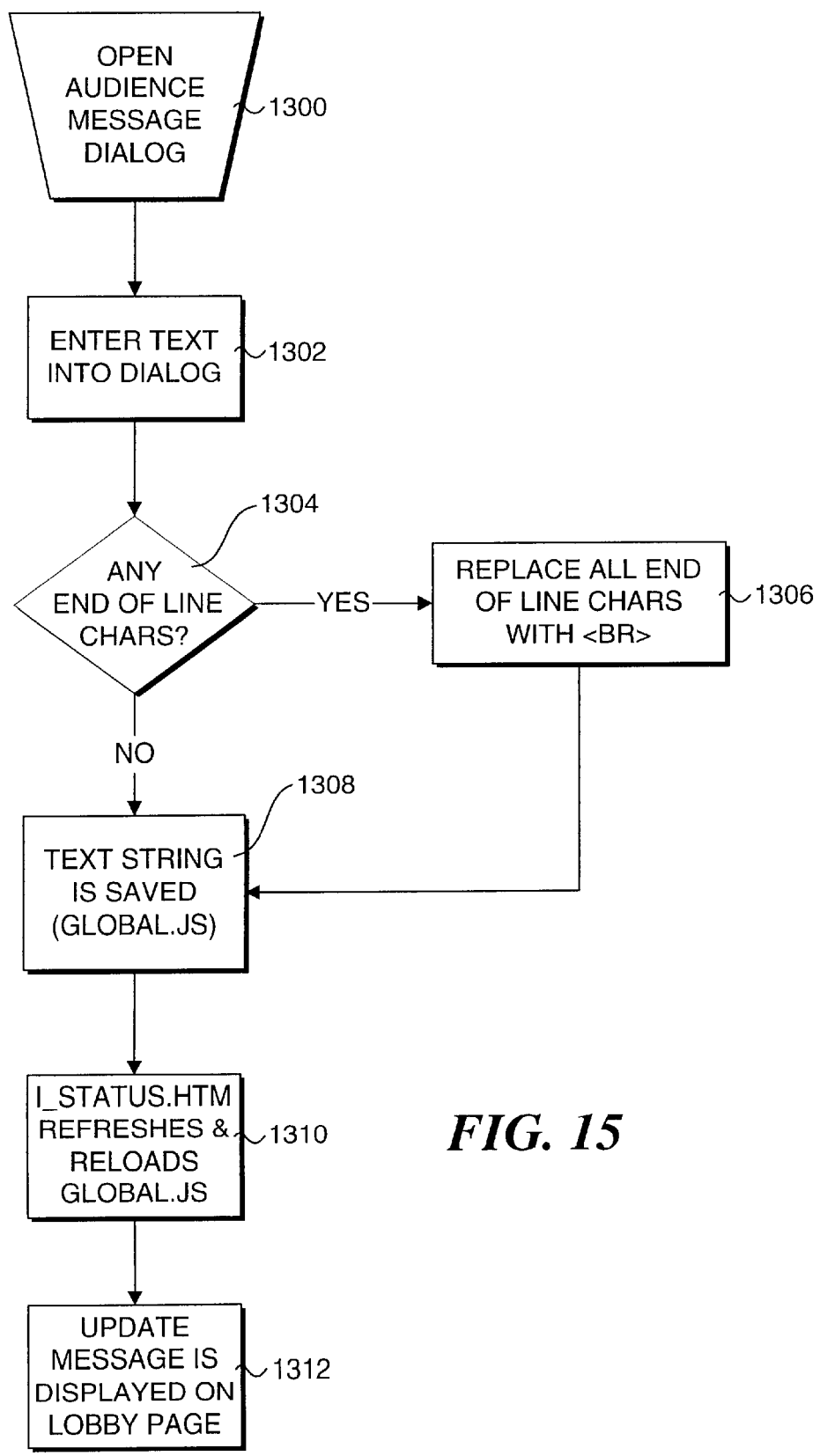
FIG. 15 is a flowchart illustrating the logic employed when sending an audience message to a lobby page that is viewed by an audience prior to the start of a presentation broadcast.
Figure 16:
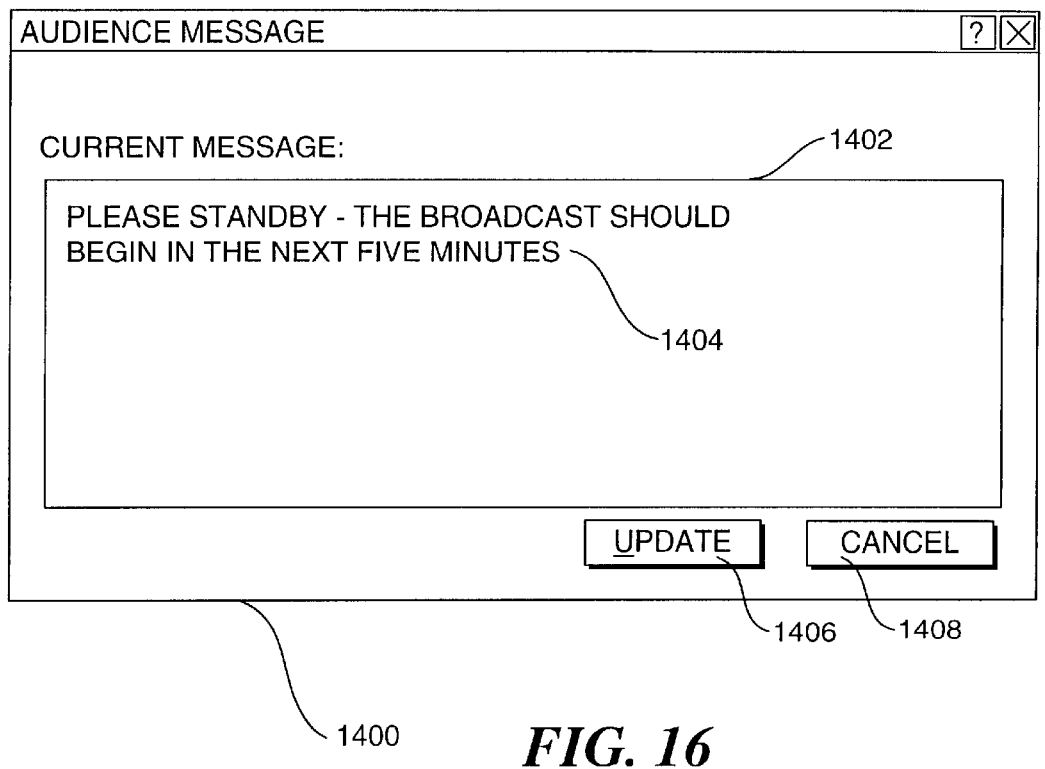
FIG. 16 is a dialog for creating audience messages to be sent to the lobby page.

As shown in FIG. 15, the process begins in a block 1300, wherein a user activates the audience message button on the broadcast presentation dialog, launching an audience message dialog 1400, as shown in FIG. 16. The audience message dialog comprise a multi-line edit control 1402, in which a text message 1404 is entered, an update button 1406, and a cancel button 1408. The user enters the current audience message (only one message is posted at a time) in the edit control, as indicated by a block 1302. The user then activates the update button, which saves the message as a text string to send the message to the lobby page. Optionally, the user may choose not to send a message by activating the cancel button.

Once a message to be sent has been selected, POWERPOINT parses the text string to identify whether any End of Line characters are present, as indicated by a decision block 1304. If the answer is yes, the logic flows to a block 1306, which replaces any End of Line characters in the text string with "<BR>" (represents a line break under HTML). The text string is then written to the global.js file in a block 1308. The global.js file holds a series of name-value pairs, one of which is a variable and string value corresponding to the update message. The block 1306 is bypassed if there are no End of Line characters in the text string.

Figure 17:
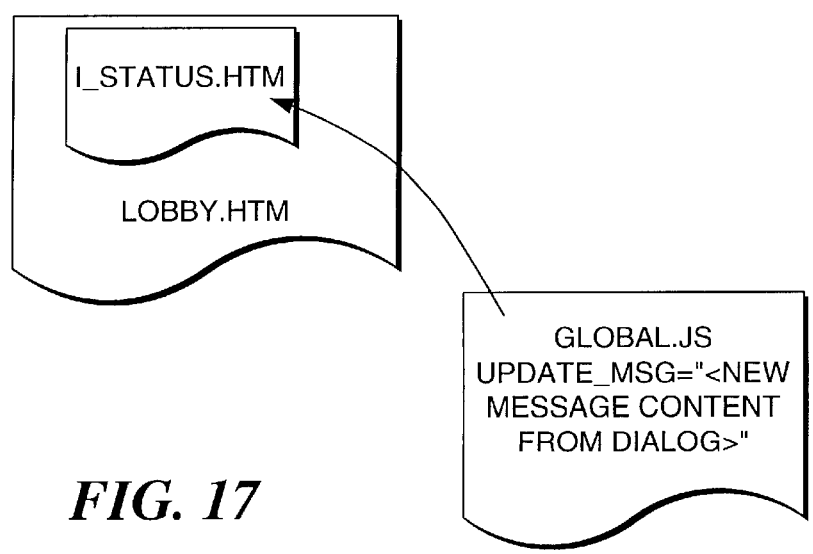
FIG. 17 illustrates the relations between the lobby page and an embedded I_status page used for updating the audience message.

The architecture of the lobby page loaded by the audience is shown in FIG. 17. The global.js file is linked to an I_status.htm HTML file, which is framed by the lobby page file (lobby.htm). When the audience members choose to view the lobby page, the outer HTML page (lobby.htm) is loaded, which loads the inner HTML page, I_status.htm. I_status.htm in turn loads the global.js file and all of its name-value pairs. I_status.htm contains refresh code that reloads the page periodically. The refresh period can be set to any length; in this instance, it is set to two seconds. Upon each refresh, the global.js file is reloaded, enabling any update message saved in the global.js file to be read in by I_status.htm, which processes the message so that it is displayed on the lobby page, as shown in a block 1310 and a block 1312, respectively. As I_status.htm is reloaded and the updated global.js file is read in, I_status.htm uses innerhtml to set the variable value to the string value written into the global.js file.

Driving Animations Remotely

It is sometimes desirable to drive the animations comprising an HTML presentation slide show (e.g. a POWERPOINT Slide Show) from a remote machine. In the past, either the presentation slides were not in HTML format, or there were no animations in the slide show. In order to perform virtual scenarios such as a one-to-many presentation, a user must be able to remotely execute commands on the audience machines to advance the presentation or to execute effects. For example, if two users browse the same web page, they are viewing two distinct copies of the same web page. In order for one user to control the web page viewed by the other, some communication needs to occur. The communication is accomplished through a combination of two technologies: embedding script commands in an ASF stream, and animations in the POWERPOINT HTML files (i.e., the presentation slides). POWERPOINT is thus able to send events via an audio/video stream to the viewer, which triggers commands on the viewer's machine and in turn effects actions on the web page displayed on the viewer's machine.

Figure 18:
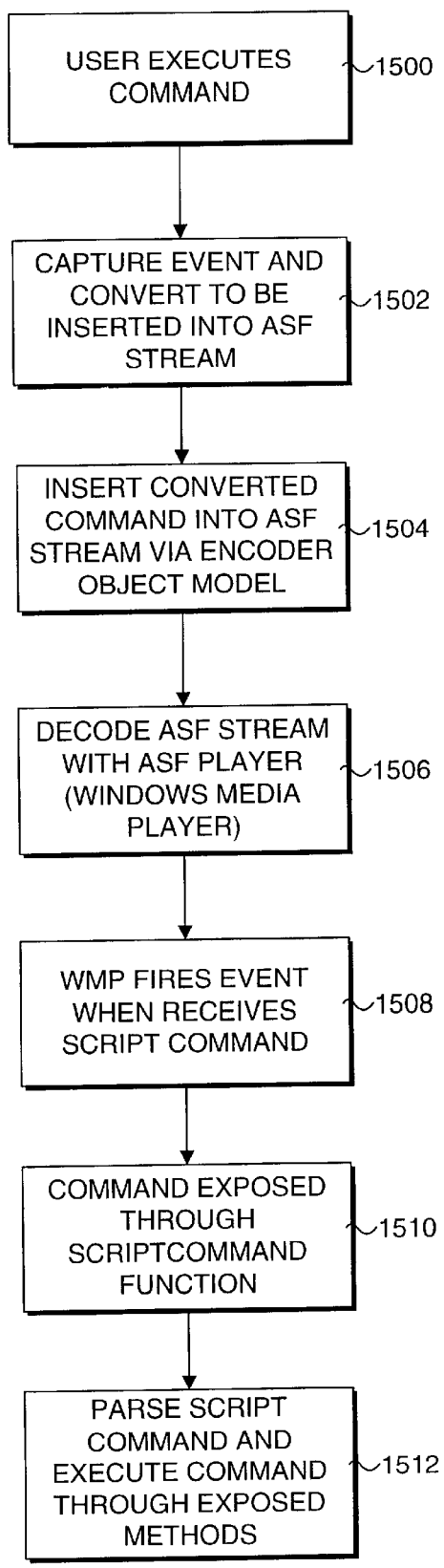
FIG. 18 is a flowchart illustrating the logic employed when driving animations in a presentation broadcast from a remote location.

As shown in FIG. 18, the process begins in a block 1500, wherein a user executes commands in POWERPOINT, such as triggering the next animation. This step generates an event, which is captured using the application object model and converted to a syntax that can be inserted in an ASF format, as indicated by a block 1502. The syntax for the format is generally of the form: Label Parameter, where the number of Parameters after Label are generally unrestricted. In the case of POWERPOINT animations, the syntax is of the form PPTCMD 11.

Using the object model of the encoding server (the WINDOWS™ Media Encoder), the converted event is inserted into the ASF stream in a block 1504. The ASF stream is sent to the ASF client player on a web page. On the client machine, the ASF client, preferably the WINDOWS™ Media Player, receives and decodes the ASF stream, as shown by a block 1506. The WINDOWS™ Media Player then executes an event when it receives a script command in a block 1508. The script command is exposed through a function called ScriptCommand in a block 1510. ScriptCommand is a parser comprising a block of javascript or vbscript code that takes the Label and passes the Parameters to another block of code. Once parsed, the Parameters can be used to trigger the command that corresponds to the Label. In a block 1512, various commands can then be executed through code comprising javascript, vbscript, or the object model of the browser, which operate on methods that are exposed by the HTML and script files to drive the animations. The animations are stored in the .js set of pages in the batch of HTML, .js, and image files that make up the web application.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for scheduling a presentation broadcast originating from a presentation broadcast source connected to a plurality of receiving computers across a computer network, comprising the steps of:
   (a) enabling a user to select a presentation to be broadcast within a presentation design application program;
   (b) entering presentation broadcast information for the presentation selected from within the presentation design application program;
   (c) selecting a time and date for the presentation broadcast;
   (d) providing a list of prospective attendees for the presentation broadcast; and
   (e) transmitting the presentation broadcast information and time and date to the prospective attendees on the list, over the computer network.

2. The method of claim 1, further comprising the step of automatically entering the time and date of the presentation broadcast into an attendee's calendar.

3. The method of claim 2, further including the step of automatically reminding attendees of the presentation broadcast a predetermined interval prior to the time of the presentation broadcast.

4. The method of claim 3, wherein the step of reminding the attendees includes the step of displaying a reminder notice dialog that includes an option to attend the presentation broadcast, whereby selection of the option automatically launches a browser that displays a location at which the presentation broadcast can be viewed on the browser.

5. The method of claim 1, wherein the presentation broadcast information includes a network address from where the receiving computers can receive the presentation broadcast.

6. The method of claim 1, further comprising the steps of:
   (a) rescheduling the time and date of the presentation broadcast; and
   (b) transmitting a notification of a rescheduled time and date of the presentation broadcast to the prospective attendees.

7. The method of claim 1, wherein the step of transmitting comprises the step of passing the presentation broadcast information from the presentation design application program to an e-mail application program for transmission in e-mail messages addressed to the prospective attendees in the list.

8. The method of claim 7, wherein the e-mail application program prepares and transmits the e-mail messages without interacting with the user, so that the user remains in the presentation design application program while the e-mail messages are prepared and transmitted.

9. The method of claim 1, further comprising the step of saving the presentation broadcast information in a presentation document.

10. The method of claim 1, further comprising the step of automatically scheduling the time and date of the presentation broadcast into an electronic calendar of the user to provide a reminder of the presentation broadcast to the user a predefined interval of time before the time it is scheduled to occur.

11. The method of claim 10, wherein the reminder includes a dialog that contains an option to automatically start the presentation broadcast at the time and date it is scheduled to occur.

12. A computer-readable medium having computer-executable instructions for performing the steps of:
   (a) enabling a user to select a presentation to be broadcast within a presentation design application program;
   (b) enabling entry of presentation broadcast information for the presentation selected from within the presentation design application program;
   (c) enabling a time and date to be selected for the presentation broadcast;
   (d) enabling a list of prospective attendees for the presentation broadcast to be provided; and
   (e) transmitting the presentation broadcast information and time and date to the prospective attendees on the list, over the computer network.

13. A computer-readable medium having computer-executable instructions for performing the steps of:
   (a) enabling a user to select a presentation to be broadcast within a presentation design application program;
   (b) enabling entry of presentation broadcast information for the presentation selected from within the presentation design application program;
   (c) enabling a time and date to be selected for the presentation broadcast;
   (d) enabling a list of prospective attendees to be provided for the presentation broadcast; and
   (e) transmitting the presentation broadcast information and time and date to the prospective attendees on the list, over the computer network, by passing the presentation broadcast information from the presentation design application program to an e-mail application program for transmission in e-mail messages addressed to the prospective attendees in the list, wherein the e-mail application program prepares and transmits the e-mail messages without interacting with the user, so that the user remains in the presentation design application program while the e-mail messages are prepared and transmitted.

14. A computer-readable medium having computer-executable instructions for performing the steps of:
   (a) enabling a user to select a presentation to be broadcast within a presentation design application program;
   (b) enabling entry of presentation broadcast information for the presentation selected from within the presentation design application program;
   (c) enabling a time and date to be selected for the presentation broadcast;
   (d) enabling a list of prospective attendees to be provided for the presentation broadcast;
   (e) transmitting the presentation broadcast information and time and date to the prospective attendees on the list, over the computer network; and
   (f) automatically scheduling the time and date of the presentation broadcast into an electronic calendar of the user to provide a reminder of the presentation broadcast to the user a predefined interval of time before the presentation broadcast is scheduled to occur.

15. A system for scheduling a network broadcast of a presentation stored as a presentation broadcast document, comprising:
   (a) a local computer having a memory in which a plurality of machine instructions are stored, a display, and a processor coupled to the memory for executing the machine instructions, the local computer being connected to a plurality of remote computers via a network;
   (b) a presentation design application program comprising a portion of the plurality of machine instructions stored in the memory of the local computer, the presentation design application program enabling a user to design a presentation document, enter presentation broadcast information pertaining to a network broadcast of the presentation document, and specify prospective attendees of the presentation broadcast, when executed by processor of the local computer; and
   (c) an information management application program comprising another portion of the plurality of the machine instructions stored in the memory of the local computer and executed by the processor of the local computer, said information management application program being in communication with the presentation design application program so that the presentation broadcast information is automatically received from the presentation design application program, the information management program automatically transmitting the presentation broadcast information to the remote computers of the prospective attendees specified by the user via the computer network, said presentation information being transmitted to the prospective attendees without interaction with the user to schedule the presentation broadcast.

16. The system of claim 15, wherein the presentation broadcast information includes a location on the network from which presentation broadcast will be accessible by the remote computers during the presentation broadcast.

17. The system of claim 16, wherein the user of the presentation design application program is enabled to replace the scheduled presentation with a replacement presentation, the replacement presentation having a new network location that is different than the network location of the scheduled presentation, and wherein the information management application program automatically transmits notifications comprising the new network location to the prospective attendees over the network.

18. The system of claim 17, wherein the plurality of computer instructions enable a user to generate updated presentation broadcast information that is automatically transmitted to the prospective attendees over the network.

19. The system of claim 17, wherein the presentation broadcast information includes a time and date of the presentation broadcast.

20. The system of claim 19, wherein the memory of at least one of the remote computers stores machine instructions that implement an information management application program when executed by the processor of said at least one remote computer, said information management application program implemented thereby reminding an attendee of a pending presentation broadcast a predetermined time before the scheduled presentation broadcast is to occur.

21. The system of claim 20, wherein the information management application program implemented by said at least remote computer enables an attendee to receive a broadcast of the presentation by selecting a control prompt that is provided to the attendee in conjunction with reminding the attendee of the scheduled presentation broadcast.

22. The system of claim 19, wherein the information management application program creates an entry into an electronic calendar of the user, specifying the time and date of the presentation broadcast.

23. The system of claim 19, wherein the information management application program reminds the user when to initiate the presentation broadcast.

24. A method for scheduling a presentation broadcast originating from an Internet web server, comprising the steps of:
   (a) providing a presentation document that is open in a presentation design application program;
   (b) entering presentation broadcast information concerning a future network broadcast of the presentation from within the presentation design application program;
   (c) passing the presentation broadcast information to the Internet web server;
   (d) launching a web page from the Internet web server, said web page including an event submission form;
   (e) entering scheduling information into the event submission form, said scheduling information including a start time and an end time for the presentation broadcast; and
   (f) saving the scheduling information and the presentation broadcast information on the Internet web server.

25. The method of claim 24, further including the steps of providing a list of presentation broadcast service providers; and enabling a user to select a presentation broadcast service provider for broadcasting the presentation, the selected presentation broadcast service provider operating the Internet web server.

26. The method of claim 24, wherein the event submission form comprises a plurality of fields that are automatically completed with at least a portion of the presentation broadcast information.

27. The method of claim 24, wherein the presentation broadcast information includes an e-mail address of a presenter of the presentation broadcast, further comprising the step of sending an e-mail message including the scheduling information and at least a portion of the presentation broadcast information from the Internet web server to the e-mail address of the presenter.

28. The method of claim 27, further comprising the step of forwarding the e-mail message to prospective presentation broadcast attendees.

29. The method of claim 24, further comprising the steps of:
   (a) selecting a previously scheduled presentation broadcast; and
   (b) entering and saving an updated start time and/or an updated end time on a form included in a web page provided by the Internet Web server, to reschedule the presentation broadcast.

30. The method of claim 24, wherein a portion of the presentation broadcast information is passed to the Internet Web server via a URL that is used to launch the web page from the Internet Web server.

* * * * *